US012786910B2

(12) United States Patent
Venugopal et al.

(10) Patent No.: US 12,786,910 B2
(45) Date of Patent: Nov. 3, 2026

(54) SYNCHRONIZATION SIGNAL BLOCK RECONFIGURATION AND SIGNALING

(71) Applicant: QUALCOMM Incorporated, San Diego, CA (US)

(72) Inventors: Kiran Venugopal, Green Brook, NJ (US); Yan Zhou, San Diego, CA (US); Navid Abedini, Basking Ridge, NJ (US); Raghu Narayan Challa, San Diego, CA (US); Yongle Wu, San Diego, CA (US); Yong Li, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 239 days.

(21) Appl. No.: 18/760,583

(22) Filed: Jul. 1, 2024

(65) Prior Publication Data

US 2026/0006568 A1 Jan. 1, 2026

(51) Int. Cl.
*H04W 56/00* (2009.01)
*H04W 48/10* (2009.01)

(52) U.S. Cl.
CPC ....... *H04W 56/0015* (2013.01); *H04W 48/10* (2013.01)

(58) Field of Classification Search
None
See application file for complete search history.

(56) References Cited

U.S. PATENT DOCUMENTS

| | | | | |
|---|---|---|---|---|
| 11,924,785 B2 * | 3/2024 | Sun | H04B 7/0617 |
| 2020/0236636 A1 | 7/2020 | Liu et al. | |
| 2023/0164016 A1 | 5/2023 | Li et al. | |
| 2023/0199659 A1 * | 6/2023 | Zhou | H04L 5/0078 370/318 |
| 2025/0358071 A1 * | 11/2025 | Ganesan | H04L 5/0007 |
| 2025/0374212 A1 * | 12/2025 | Dai | H04L 5/0048 |

OTHER PUBLICATIONS

International Search Report and Written Opinion PCT/US2025/032124 ISA/EPO Sep. 10, 2025.

* cited by examiner

*Primary Examiner* — Nguyen H Ngo
(74) *Attorney, Agent, or Firm* — HARRITY & HARRITY, LLP

(57) ABSTRACT

A method of wireless communication performed by a first wireless communication device includes: receiving, from a second communication device, a sequence of primary synchronization signals (PSSs) at a first periodicity; receiving, from the second communication device, a sequence of indications at the first periodicity, each indication of the sequence of indications indicating presence of an SSB of the sequence of SSBs during a period of the first periodicity; and monitoring, based on a first indication of the sequence of indications, for a first synchronization signal block (SSB) of a sequence of SSBs, wherein the sequence of SSBs is associated with a first set of frequencies and a second periodicity different from the first periodicity.

20 Claims, 15 Drawing Sheets

SYNCHRONIZATION SIGNAL BLOCK RECONFIGURATION AND SIGNALING

TECHNICAL FIELD

This application relates to wireless communication systems, and more particularly reconfiguration and signaling of periodic full and partial synchronization signal blocks (SSBs).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as mmWave bands. NR is also designed to operate across different spectrum types, from licensed spectrum to unlicensed and shared spectrum.

BSs may use synchronization signal blocks (SSBs) to establish communication with UEs. SSBs may be transmitted periodically by a BS in a number of channels and/or spatial directions. The overhead of periodic SSB transmissions may be a significant source of power consumption in a network. There is a need in the art for efficient techniques for synchronization signaling while maintaining key performance parameters for user equipment communication.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a first communication device one or more memories and one or more processors coupled to the one or more memories, the one or more memories storing instructions that are executable by the one or more processors. The processors are configured individually or in any combination, to cause the first communication device to receive, from a second communication device, a sequence of primary synchronization signals (PSSs) at a first periodicity. The processors are further configured to cause the first communication device to receive, from the second communication device, a sequence of indications at the first periodicity, each indication of the sequence of indications indicating presence of an SSB of the sequence of SSBs during a period of the first periodicity. The processors are further configured to cause the first communication device to monitor, based on a first indication of the sequence of indications, for a first synchronization signal block (SSB) of a sequence of SSBs, wherein the sequence of SSBs is associated with a first set of frequencies and a second periodicity different from the first periodicity.

In an additional aspect of the disclosure, a first communication device comprises one or more memories and one or more processors coupled to the one or more memories, the one or more memories storing instructions that are executable by the one or more processors. The processors are configured individually or in any combination, to cause the first communication device to transmit, to a second communication device, a sequence of synchronization signal block (SSB) bursts over a first set of frequencies at a first periodicity. The processors are further configured to cause the first communication device to transmit, to the second communication device, a sequence of primary synchronization signal (PSS) bursts at a second periodicity different from the first periodicity. The processors are further configured to cause the first communication device to transmit, to the second communication device, a sequence of bursts of indications at the second periodicity, each indication of the sequence of bursts of indications indicating presence of an SSB of the sequence of SSB bursts during a period of the second periodicity.

In another aspect of the disclosure, a first communication device comprises one or more memories and one or more processors coupled to the one or more memories, the one or more memories storing instructions that are executable by the one or more processors. The processors are configured individually or in any combination, to cause the first communication device to receive, from a second communication device, a sequence of synchronization signal blocks (SSBs) over a first set of frequencies at a first periodicity, each SSB associated with an SSB burst including a respective plurality of SSBs. The processors are further configured to cause the first communication device to receive, from the second communication device, a sequence of primary synchronization signals (PSSs) at a second periodicity different from the first periodicity. The processors are further configured to cause the first communication device to monitor for at least one additional SSB associated with additional SSB bursts over the first set of frequencies and not in the sequence of SSBs.

In yet another aspect of the disclosure, a first communication device comprises one or more memories and one or more processors coupled to the one or more memories, the one or more memories storing instructions that are executable by the one or more processors. The processors are configured individually or in any combination, to cause the first communication device to transmit, to a second communication device, a sequence of synchronization signal blocks (SSBs) over a first set of frequencies at a first periodicity, each SSB associated with an SSB burst including a respective plurality of SSBs. The processors are further configured to cause the first communication device to transmit, to the second communication device, a sequence of primary synchronization signals (PSSs) at a second periodicity different from the first periodicity. The processors are further configured to cause the first communication device to transmit, to the second communication device, additional SSBs associated with additional SSB bursts over the first set of frequencies.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
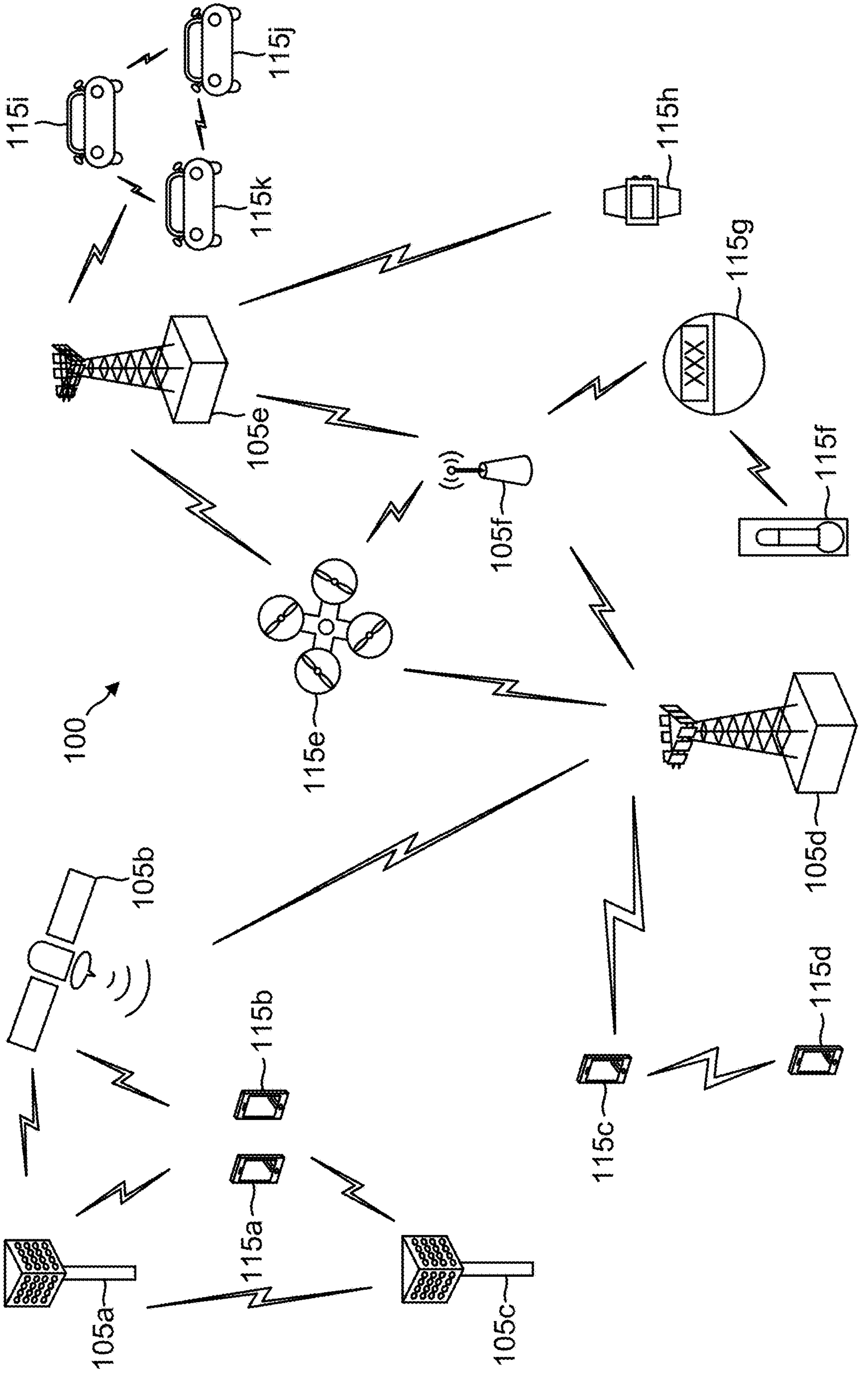
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms “networks” and “systems” may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named “3rd Generation Partnership Project” (3GPP), and cdma2000 is described in documents from an organization named “3rd Generation Partnership Project 2” (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1 M nodes/$km^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/$km^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHZ, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Base stations (BSs) may use synchronization signal blocks (SSBs) to establish communication with UEs. SSBs may be transmitted periodically by a BS in a number of channels and/or spatial directions. The overhead of periodic SSB transmissions may be a significant source of power consumption in a network. To increase network efficiency, aspects of the present disclosure describe methods for transmitting and receiving different sequences of SSBs, including SSBs at different periodicities. In some aspects, rather than transmitting a 4-symbol SSB with a PSS included, the PSSs may be transmitted as a separate burst followed by a burst of 3 or 4 symbol SSBs. The SSB burst may be transmitted at a different periodicity than the PSS burst. This allows for a UE to monitor for cell presence, maintain synchronization, etc. by monitoring for PSSs, while receiving fewer SSBs. In some aspects, when a UE is connected it may automatically, or upon request to the BS, receive additional SSBs from the BS.

The periodicity of SSBs may be communicated to UEs in a number of manners. For example, the PSSs transmitted in a PSS burst may include one or more additional bits that indicate the presence of an SSB in the same or subsequent cycle. For example, a single bit may indicate the presence of an associated SSB within the same cycle, or additional bits may be used to indicate other patterns or the presence of an SSB in a future cycle.

To aid in combining SSBs that are transmitted over variable periodicities, additional signaling may be used to indicate the periodicity of SSBs. For example, a PSS (either in a PSS burst or the PSS within an SSB) may indicate the periodicity of an SSB to aid in combining. In aspects where a PSS burst is always transmitted at the same periodicity, a UE may combine the PSSs at the known periodicity, and receive an indicator from the combined PSS to determine the periodicity of the associated SSB.

Aspects of the present disclosure may provide several benefits. For example, power utilization of the network may be reduced by allowing for less frequency SSB transmissions. Latency may be not as affected by continuing to transmit PSSs at a higher rate. The signaling for SSB pattern/presence further allows for more efficient power utilization by a UE since the number of hypotheses for a UE may be reduced. For example, rather than monitoring for an SSB every 20 ms in case one is transmitted, a UE may only monitor for an SSB at indicated times. Additional benefits are described throughout the description below.

FIG. 1 illustrates a wireless communication network 100 according to some aspects of the present disclosure. The network 100 may be a 5G network. The network 100 includes a number of base stations (BSs) 105 (individually labeled as 105*a*, 105*b*, 105*c*, 105*d*, 105*e*, and 105*f*) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used. The actions of FIGS. 4-10 may be performed by any of UEs 115.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs

105*b*, 105*d*, and 105*e* may be regular macro BSs, while the BSs 105*a* and 105*c* may be macro BSs enabled with one of three dimension (3D), full dimension (FD), or massive MIMO. The BSs 105*a* and 105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, an Internet of Things (IoT) device, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a* and 105*c* may serve the UEs 115*a* and 115*b* using 3D beamforming and coordinated spatial techniques, such as coordinated multipoint (COMP) or multi-connectivity. The macro BS 105*d* may perform backhaul communications with the BSs 105*a* and 105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support communications with ultra-reliable and redundant links for devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as vehicle-to-vehicle (V2V), vehicle-to-everything (V2X), cellular-V2X (C-V2X) communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using hybrid automatic repeat request (HARQ) techniques to improve communication reliability, for example, to provide an ultra-reliable low-latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ acknowledgement (ACK) to the BS 105. Conversely, if the UE 115 fails to receive the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a high frequency band, for example, in a frequency range 1 (FR1) band or a frequency range 2 (FR2) band. FR1 may refer to frequencies in the sub-6 GHz range and FR2 may refer to frequencies in the mmWave range. To overcome the high path-loss at high frequency, the BSs 105 and the UEs 115 may communicate with each other using directional beams. For instance, a BS 105 may transmit SSBs by sweeping across a set of predefined beam directions and may repeat the SSB transmissions at a certain time interval in the set of beam directions to allow a UE 115 to perform initial network access.

In some aspects, the network 100 may be an IoT network and the UEs 115 may be IoT nodes, such as smart printers, monitors, gaming nodes, cameras, audio-video (AV) production equipment, industrial IoT devices, and/or the like. The transmission payload data size of an IoT node typically may be relatively small, for example, in the order of tens of bytes. In some aspects, the network 100 may be a massive IoT network serving tens of thousands of nodes (e.g., UEs 115) over a high frequency band, such as a FR1 band or a FR2 band.

Figure 2:
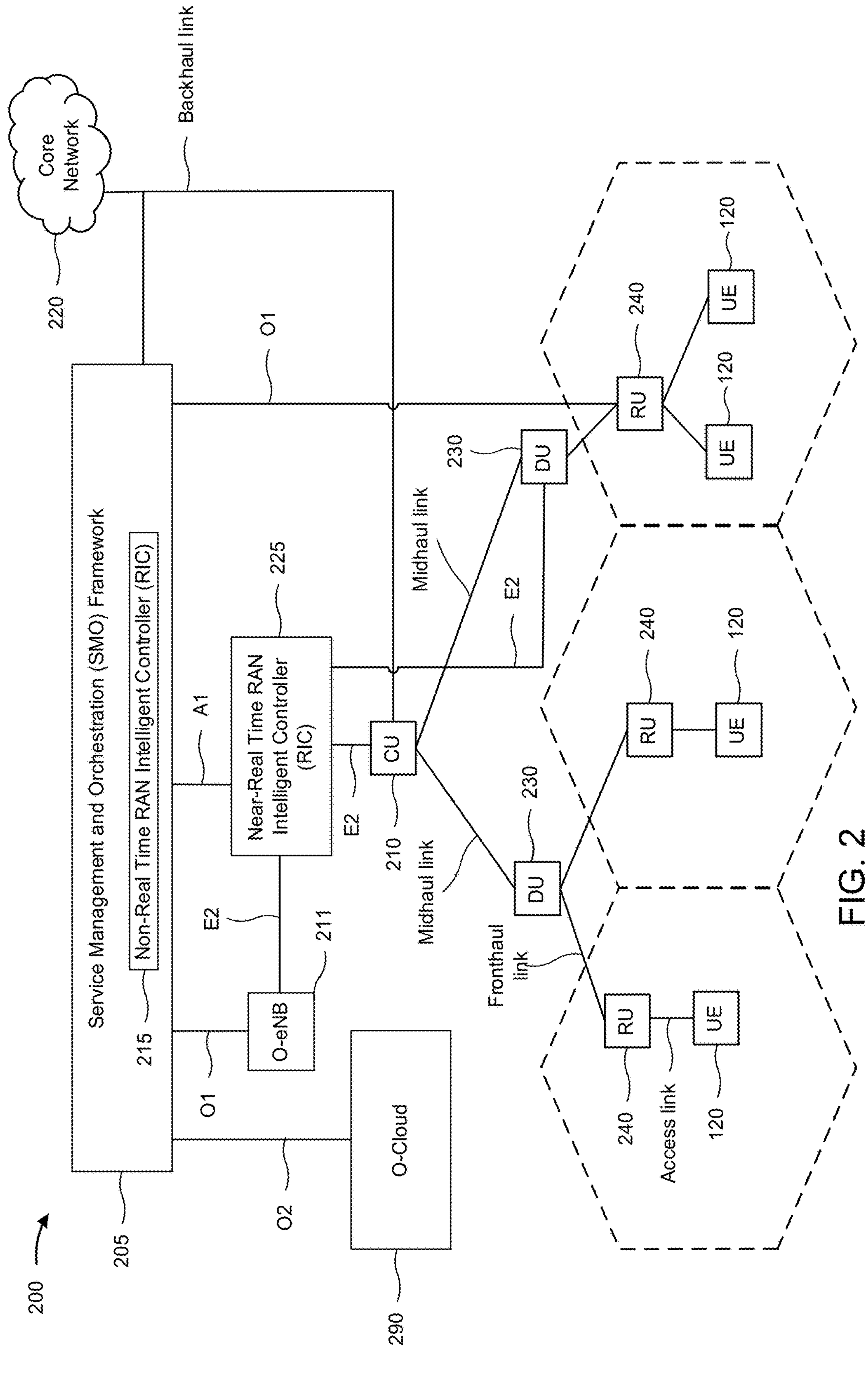
FIG. 2 illustrates an example disaggregated base station architecture according to some aspects of the present disclosure.

FIG. 2 shows a diagram illustrating an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (Rus) 240 via respective fronthaul links. The Rus 240 may communicate with respective UEs 115 via one or more radio frequency (RF) access links. In some implementations, the UE 115 may be simultaneously served by multiple Rus 240.

Each of the units, i.e., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more Rus 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 115. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, Rus 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more Rus 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

In some aspects, a first UE 115 may receive a cross link interference (CLI) measurement resource configuration from the RU 240, DU 230, and/or CU 210. In some aspects, the CLI measurement resource configuration may indicate a plurality of CLI measurement occasions. The first UE 115 may measure CLI associated with a second UE 115 in the plurality of CLI measurement occasions and transmit one or more CLI measurement reports associated with the measured CLI to the RU 240, DU 230, and/or CU 210.

Figure 3:
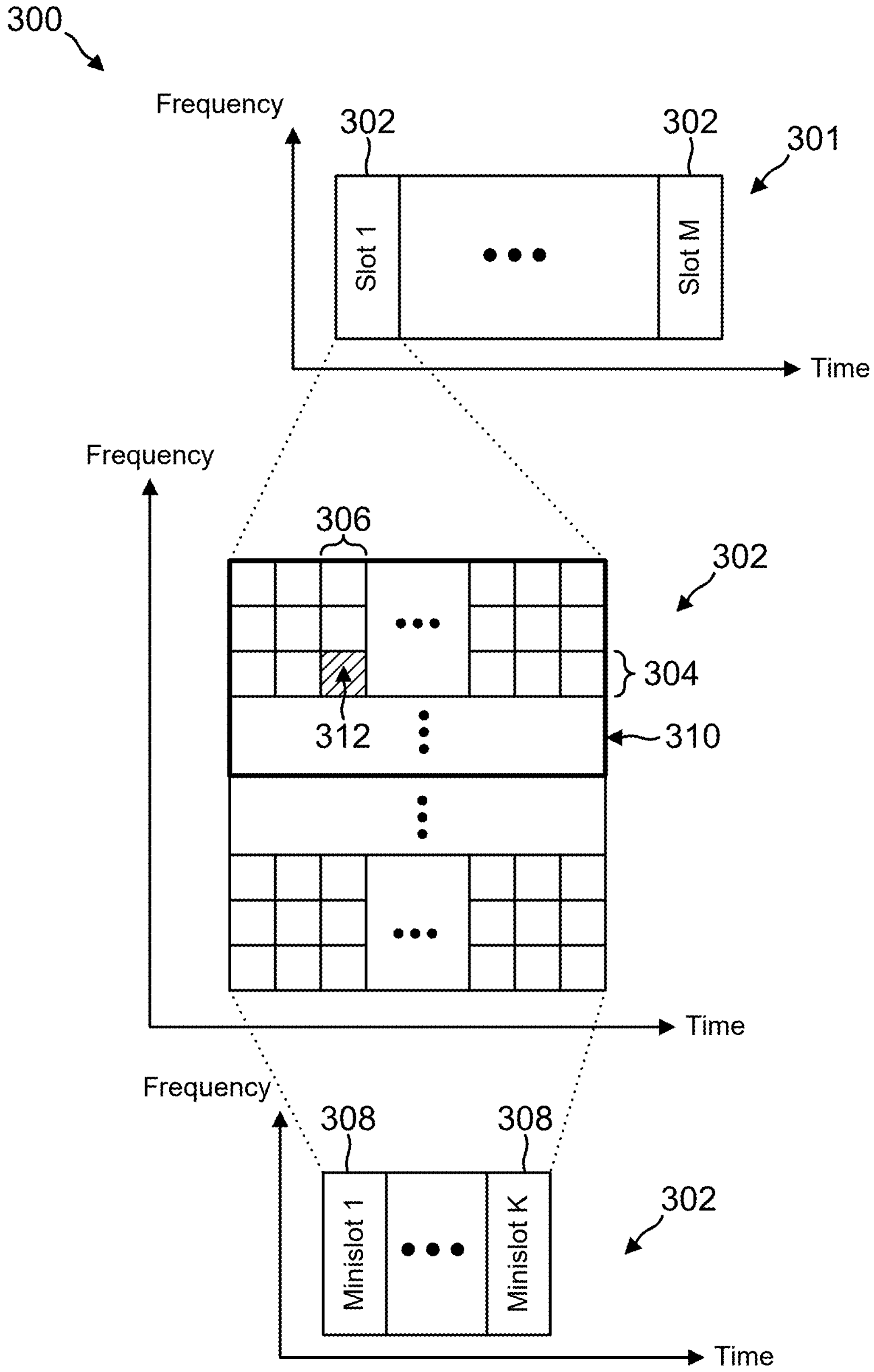
FIG. 3 illustrates a radio frame structure according to some aspects of the present disclosure.

FIG. 3 is a timing diagram illustrating a radio frame structure 300 according to some aspects of the present disclosure. The radio frame structure 300 may be employed by BSs such as the BSs 105 and UEs such as the UEs 115 in a network such as the network 100 for communications. In particular, the BS may communicate with the UE using time-frequency resources configured as shown in the radio frame structure 300. In FIG. 3, the x-axes represent time in some arbitrary units and the y-axes represent frequency in some arbitrary units. The transmission frame structure 300 includes a radio frame 301. The duration of the radio frame 301 may vary depending on the aspects. In an example, the radio frame 301 may have a duration of about ten milliseconds. The radio frame 301 includes M number of slots 302, where M may be any suitable positive integer. In an example, M may be about 10.

Each slot 302 includes a number of subcarriers 304 in frequency and a number of symbols 306 in time. The number of subcarriers 304 and/or the number of symbols 306 in a slot 302 may vary depending on the aspects, for example, based on the channel bandwidth, the subcarrier spacing (SCS), and/or the cellular processor (CP) mode. One subcarrier 304 in frequency and one symbol 306 in time forms one resource element (RE) 312 for transmission. A resource block (RB) 310 is formed from a number of consecutive subcarriers 304 in frequency and a number of consecutive symbols 306 in time.

In an example, a network unit (e.g., BS 105 in FIG. 1, CU 210, or DU 230 in FIG. 2) may schedule a UE (e.g., UE 115 in FIG. 1) for UL and/or DL communications at a time-granularity of slots 302 or mini-slots 308. Each slot 302 may be time-partitioned into K number of mini-slots 308. Each mini-slot 308 may include one or more symbols 306. The mini-slots 308 in a slot 302 may have variable lengths. For example, when a slot 302 includes N number of symbols 306, a mini-slot 308 may have a length between one symbol 306 and (N−1) symbols 306. In some aspects, a mini-slot 308 may have a length of about two symbols 306, about four symbols 306, or about seven symbols 306. In some examples, the BS may schedule UE at a frequency-granularity of a resource block (RB) 310 (e.g., including about 12 subcarriers 304).

Figure 4:
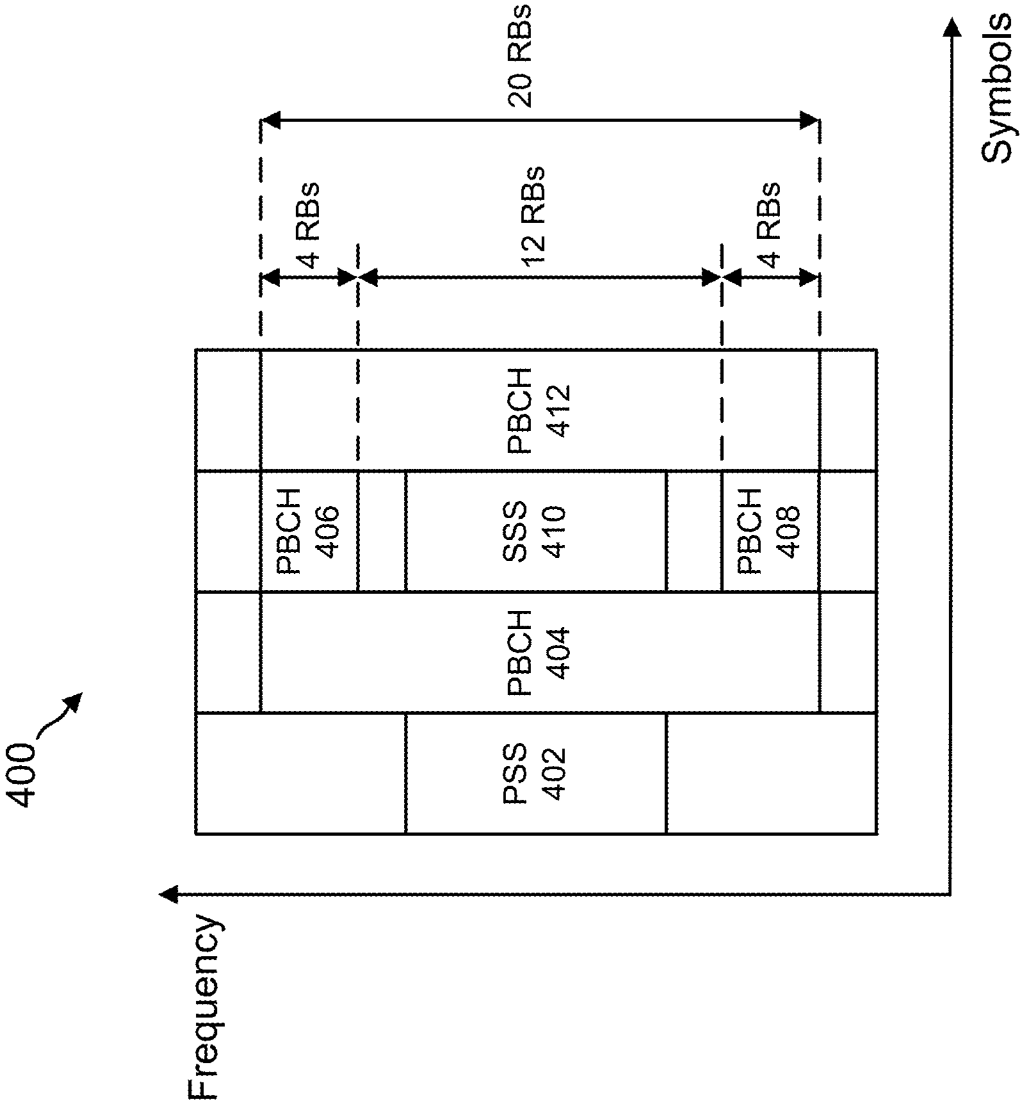
FIG. 4 illustrates an exemplary synchronization signal block, according to some aspects of the present disclosure.

FIG. 4 illustrates an exemplary synchronization signal block 400, according to some aspects of the present disclosure. A BS 105 (or other network entity) can transmit a SSB 400 which may include synchronization signals (e.g., including a primary synchronization signal (PSS) 402 and/or a secondary synchronization signal (SSS) 410) in a network (e.g., network) 100. SSB 400 may further include one or more PBCH messages, which may include a demodulation reference signal (DMRS) or data. In some aspects, SSB 400 includes a PSS 402 in a first symbol, over a first set of frequencies. The remaining three symbols may include for PBCH 404, PBCH 406, PBCH 408, PBCH 412, and SSS 410. PBCH 404 may span a larger set of frequencies than PSS 402 and SSS 410. For example, PBCH 404 and PBCH 412 may use 20 RBs. SSS 410 may be frequency division multiplexed with PBCH 406 and PBCH 408.

Figure 6A:
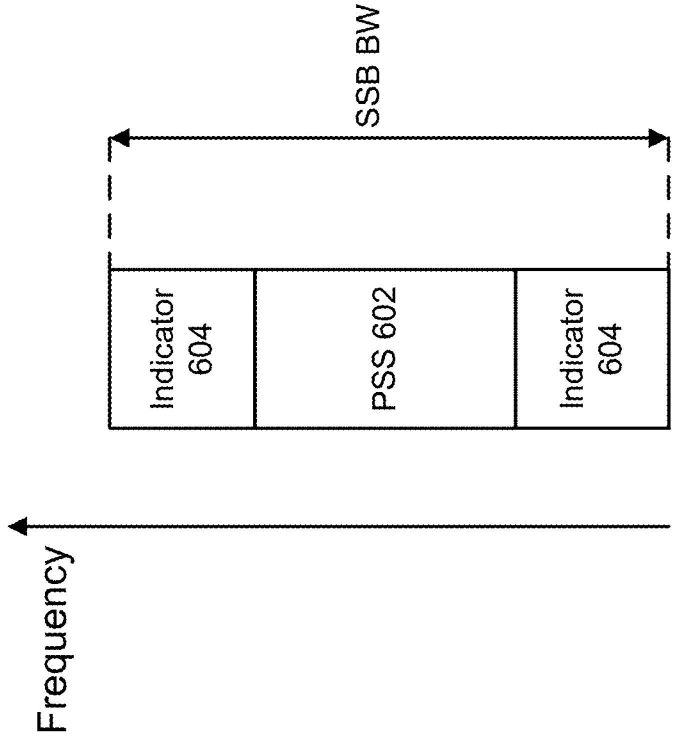
FIG. 6A illustrates a frequency division multiplexed PSS and indicator, according to some aspects of the present disclosure.
Figure 6B:
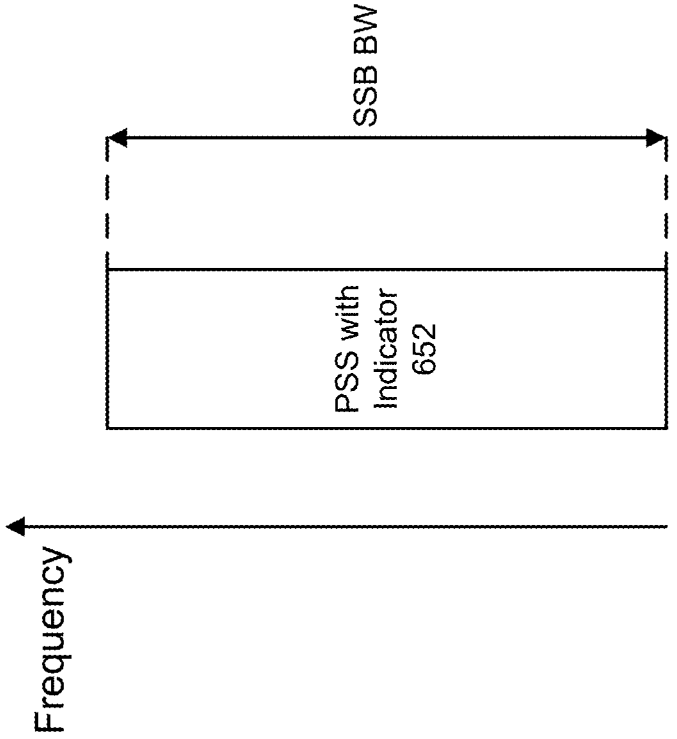
FIG. 6B illustrates a modified PSS with an indicator, according to some aspects of the present disclosure.

In some aspects, as described in FIG. 6B, a PSS may be adapted to utilize the same frequencies as PBCH 404 and/or PBCH 412. Further, as described herein, the SSB 400 may be modified to not include PSS 402. For example, in some aspects SSB 400 is a 3-symbol SSB with PBCHs 404, 406, 408, and 412, and SSS 410. In some aspects, SSB 400 is a 2-symbol SSB with each symbol having a PBCH which may be frequency division multiplexed with an SSS.

In some aspects, SSB 400 may be transmitted (e.g., by a BS 105) in bursts including multiple SSBs 400. Each SSB of an SSB burst may have an associated ID. Each SSB of an SSB burst may be transmitted in a different spatial direction. By receiving an SSB 400, a UE 115 may determine an optimal/preferred direction for receiving and/or transmitting signals, for example by determining the receives SSB 400 with the highest received power.

Figure 5:
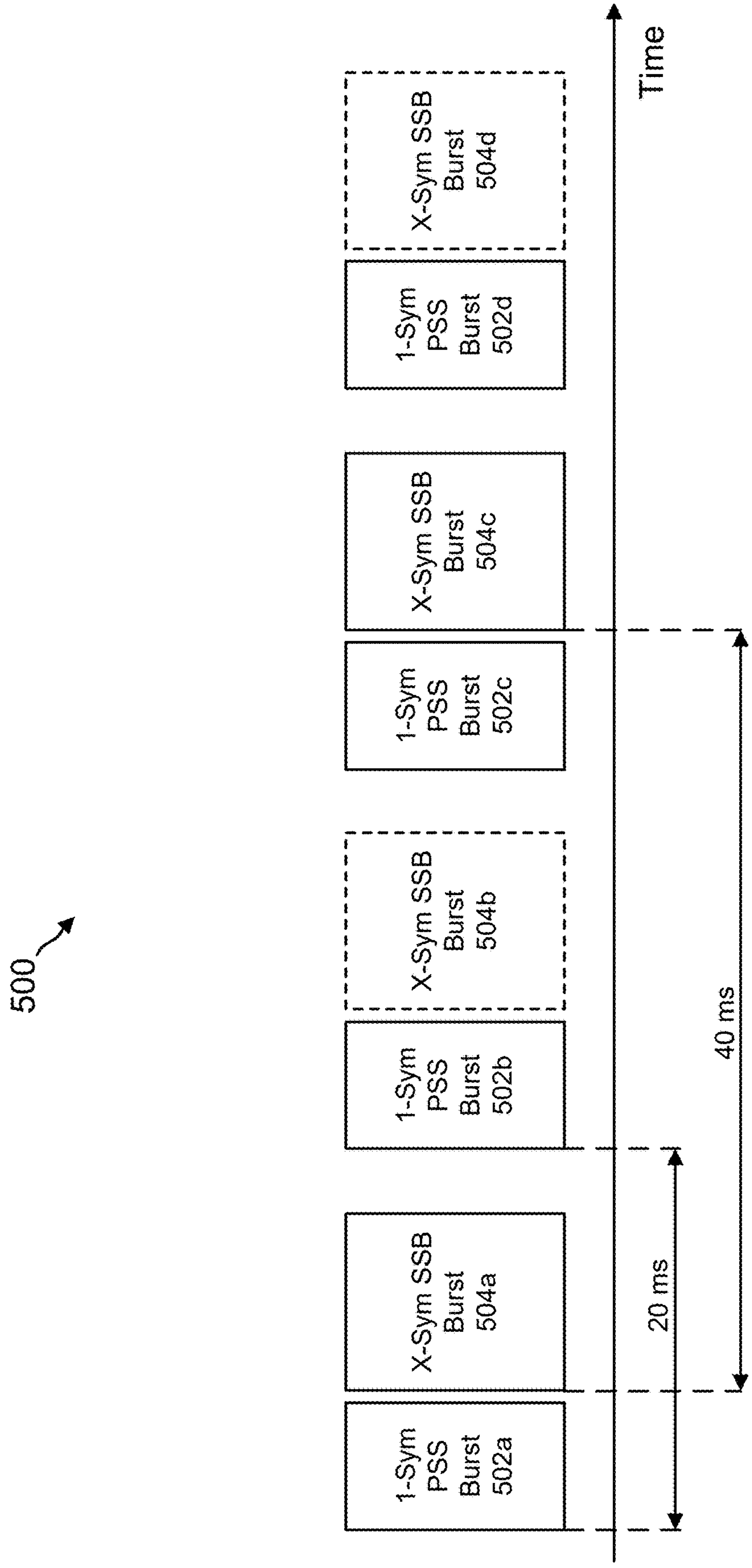
FIG. 5 illustrates an exemplary SSB sequence, according to some aspects of the present disclosure.

FIG. 5 illustrates an exemplary SSB sequence 500, according to some aspects of the present disclosure. As illustrated, a network entity (e.g., a BS 105) may transmit a 1 symbol PSS burst 502*a*. The 1 symbol PSS burst 502*a* may include multiple PSS transmissions, each one symbol in length. In some aspects, each PSS of PSS burst 502*a* is transmitted with a different transmission parameter (e.g., in a different spatial direction associated with a certain beam). As illustrated, the PSS burst 502*a* may be followed by an X-symbol SSB burst 504*a*. In some aspects, each SSB of SSB burst 504*a* is a 2, 3, or 4 symbol SSB 400. In some aspects, each PSS of PSS burst 502*a* is associated with a respective SSB of SSB burst 504*a*. This pattern may repeat, for example ever 20 ms, with a PSS burst 502 followed by an associated SSB burst 504. FIG. 5 illustrates a few exemplary repetitions including PSS burst 502*b* with SSB burst 504*b*, PSS burst 502*c* with SSB burst 504*c*, and PSS burst 502*d* with SSB burst 504*d*.

To reduce energy consumption, the transmitting entity may transmit less frequent SSB bursts 502. In the illustrated example, SSB bursts 504*b* and 504*d* are not transmitted (as indicated by the dashed lines) so that the SSB bursts 504 are effectively transmitted at 40 ms intervals. PSS bursts 402 may still be transmitted at the more frequency periodicity (e.g., 20 ms) so that UEs may maintain synchronization even with less frequent SSB bursts 504. Other patterns may be configured, for example SSB bursts 504 every 80 ms with PSS bursts 502 every 20 ms. Less frequent SSB bursts 504 results in lower energy consumption but may lead to higher initial access latency. The presence of the more frequent PSS bursts 502 maintains the same cell presence detection latency. In some aspects, the PSS bursts 502 may be used for cell presence detection and the associated SSB bursts 504 may be used for cell identification. In some aspects, the presence of PSS burst 502 allows for SSB bursts 504 to not include a separate PSS (i.e., a 3 symbol SSB). In other aspects, SSB bursts 504 also include a PSS (i.e., a 4 symbol SSB), meaning that the PSS bursts 502 are transmitted in addition to the SSB PSSs. In some aspects, the PSSs of PSS bursts 502 may be common PSSs, or limited search hypotheses.

The ability to transmit PSS bursts 502 with or without corresponding SSB bursts 504 presents an ambiguity for a receiving UE 115. A receiving UE 115 may effectively have two hypotheses after receiving a PSS in a PSS burst 502. A UE receiving a PSS burst 502 may have to monitor for corresponding SSB bursts 504 after each PSS burst 502 even when an SSB burst 504 is not transmitted. In order to reduce SSB hypotheses for a detected PSS, an SSB presence indicator may be included with a PSS burst 502. In some aspects, a PSS burst 502 that includes a SSB presence indicator may indicate that an SSB burst 504 will be transmitted that same cycle as the PSS burst 502. If the PSS burst 502 includes the presence indicator, the UE may search for the SSB burst 404 in that cycle. For example, if PSS burst 502*a* includes the presence indicator, then a UE 115 may search for SSB burst 504*a*, then if there is no presence indicator included with PSS burst 502*b* then the UE 115 may not search for SSB burst 504*b*.

In some aspects, the presence indicator may be a single bit that indicates if an SSB burst is present in the same cycle as the PSS burst 502 including the indicator. For example, a 0 value may indicate no SSB burst 504 is present, while a 1 value may indicate an SSB burst 504 is present. In some aspects, the presence indicator may be a multi-bit indicator, and may indicate presence of an SSB burst 504 in a different cycle than the one in which the presence indicator is transmitted. For example, a 2-bit indicator may indicate a PSS order index (e.g., 1, 2, 3, 4) within each 80 ms SSB period. Based on the PSS order index, a UE 115 may go directly to the location/detection window with an actual SSB burst 504. In an example, a presence indicator in PSS burst 502*a* indicates the presence of SSB burst 504*c*. In some aspects, a multi-bit indicator may signal a pattern ID and an associated period, indicating the pattern of SSBs.

In some aspects, in addition to having a 1 symbol PSS burst 502 each SSB burst cycle, a 1 symbol SSS burst (not shown) may be included after each PSS burst 502. A UE 115 may attempt to decode/verify a SSS each time it detects a PSS peak. This may reduce the number of hypotheses for a UE 115 to attempt, at the cost of higher network energy usage due to the increased rate of transmitting SSSs.

In some aspects, the SSB bursts that are always transmitted (e.g., every 40 ms or 80 ms) may include different patterns/data than those that are optionally skipped. For example, SSB burst 504*a* and SSB burst 504*b* may have different content. This may include different signaling (e.g., the presence or lack of an SSS) and/or different data transmitted within the PBCH, SSS, or PSS if included.

FIG. 6A illustrates a frequency division multiplexed PSS 602 and indicator 604, according to some aspects of the present disclosure. PSS 602 may be a PSS in a PSS burst 502. As described in FIG. 4, a PSS may use fewer frequencies than PBCH in an SSB 400. By maintaining the frequency bandwidth of PSS 602, a presence indicator 604 may use the unused frequencies up to the full bandwidth of an SSB 400. The resources used by presence indicator 604 may include four RBs in the frequencies above PSS 602, and four RBs in the frequencies lower than PSS 602, resulting in four RBs of bandwidth. In some aspects, when a UE 115 detects a PSS beak, the UE 115 may further detect the presence indicator. The presence indicator 604 may by implemented as a reference signal, or may include encoded bits with DMRS.

FIG. 6B illustrates a modified PSS with an indicator 652, according to some aspects of the present disclosure. PSS with indicator 652 may be a PSS in a PSS burst 502. As illustrated, PSS with indicator 652 may use the full SSB 400 bandwidth, and the presence indicator may be included with the PSS itself. An extended PSS with indicator 652 may carry more information than a PSS 402, but may also increase peak search complexity for a UE 115 due to the larger bandwidth.

Figure 7:
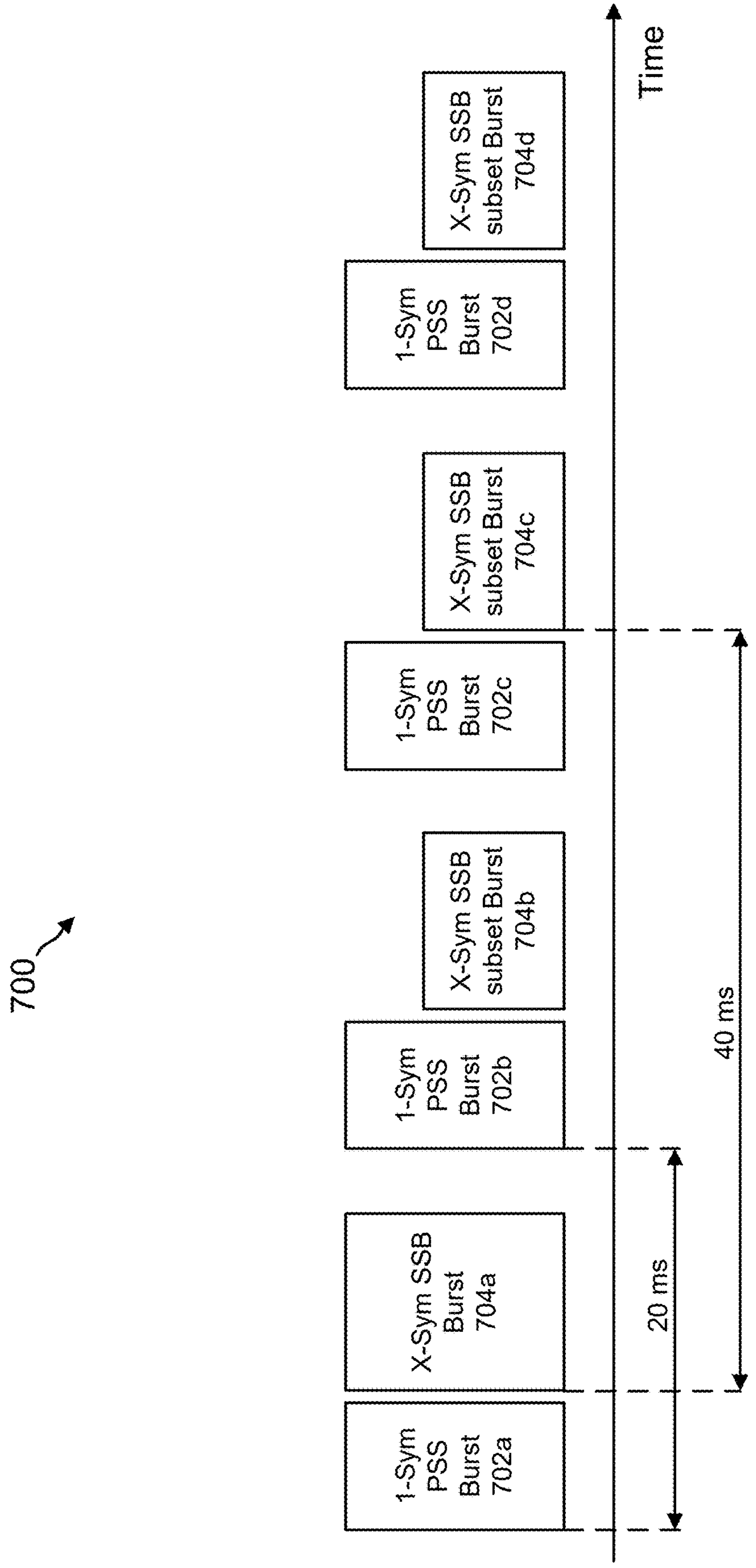
FIG. 7 illustrates an exemplary SSB sequence, according to some aspects of the present disclosure.

FIG. 7 illustrates an exemplary SSB sequence 700, according to some aspects of the present disclosure. 1 symbol PSS burst 702*a* and *x*-symbol SSB burst 704*a* may be similar to PSS burst 502*a* and SSB burst 504*a* in FIG. 5. In some aspects, rather than having either all SSBs of an SSB burst transmitted to not transmitted together, a network entity (e.g., BS 105) may transmit a subset of SSBs in an SSB burst. For example, SSBs associated with connected UEs 115 may be transmitted every 20 ms cycle, while those SSBs which are not associated with connected UEs 115 may be transmitted at a lower periodicity (e.g., 80 ms). As illustrated, PSS burst 702*b* may be transmitted followed by an SSB subset burst 704*b* that includes a subset of the SSBs that are present in SSB burst 704*a*. Similarly, PSS bursts 702*c* and 702*d* may be followed by SSB subset bursts 704*c* and 704*d*.

In some aspects, a network entity (E.g., BS 105) may transmit SSBs to connected UEs 115 based on the connectivity. For example, a network entity may be configured based on a rule that connected UEs 115 have a maximum period between SSBs. In some aspects, a UE 115 may need to request additional SSBs. A UE 115 may indicate a requested period, repetition number per SSB beam (for CSI-RS), and/or SSB IDs which may be determined explicitly or implicitly (e.g., associated with indicated/activated TCIs). In some aspects, a UE 115 may request additional SSBs via a static request (e.g., via an indication of UE capability). In some aspects, a UE 115 may request additional SSBS via a dynamic request (e.g., assistance information in UCI, MAC-CE, and/or RRC. Additional SSBs may be a periodic or non-periodic pattern to accommodate with an existing SSB burst pattern. For example, a full SSB burst (e.g., SSB burst 704*a*) may be transmitted at a first periodicity (e.g., every 80 ms) and a UE 115 may request additional SSBs that may be transmitted at SSB subset bursts 704*b*, 704*c*, and/or 704*d* in a periodic or aperiodic pattern.

In some aspects, in addition to having a 1 symbol PSS burst 702 each SSB burst cycle, a 1 symbol SSS burst (not shown) may be included after each PSS burst 702. A UE 115 may attempt to decode/verify a SSS each time it detects a PSS peak. This may reduce the number of hypotheses for a UE 115 to attempt, at the cost of higher network energy usage due to the increased rate of transmitting SSSs.

In some aspects, the SSB bursts that are always transmitted (e.g., every 40 ms or 80 ms) may include different patterns/data than those that are included only for connected UEs/on request. For example, SSB burst 704*a* and SSB burst 704*b* may have different content. This may include different signaling (e.g., the presence or lack of an SSS) and/or different data transmitted within the PBCH, SSS, or PSS if included.

Figure 8:
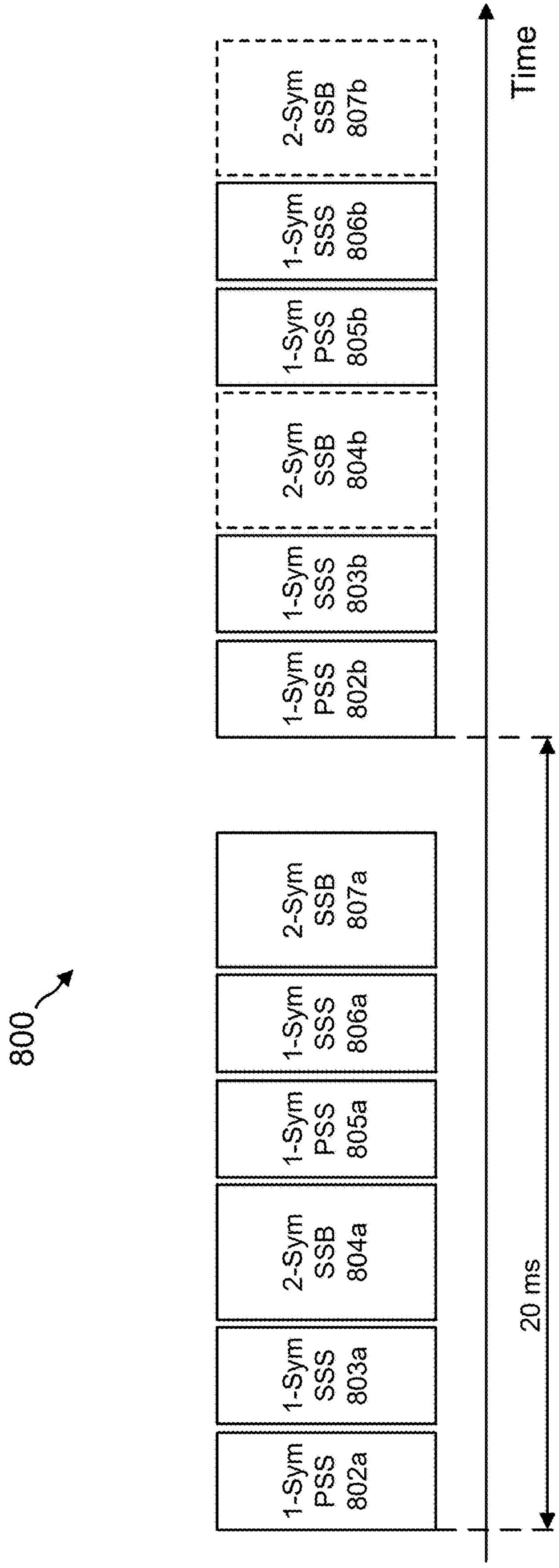
FIG. 8 illustrates an exemplary SSB sequence, according to some aspects of the present disclosure.

FIG. 8 illustrates an exemplary SSB sequence 800, according to some aspects of the present disclosure. SSB sequence 800 includes SSB bursts with each SSB of the SSB burst including a 1 symbol PSS 802, a 1 symbol SSS 803, and optionally a 2 symbol SSB 804 (i.e., two symbols of PBCH signals). Rather than all the PSSs being transmitted before all the SSSs and/or PBCHs, the signals are interleaved with each SSS 803 and SSB 804 following directly after the associated PSS 802. In the illustrated example, PSS 802*a* is followed by SSS 803*a*, which is followed by SSB 804*a*. The sequence is repeated with PSS 805*a*, SSS 806*a*, and SSB 807*a*. This patten may continue for any number of repetitions within each cycle as a continuous burst. In some aspects, the burst repeats at some configured periodicity (e.g., 20 ms as illustrated). In the illustrated example, the second burst includes PSS 802*b*, SSS 803*b*, SSB 804*b*, PSS 805*b*, SSS 806*b*, and SSB 807*b* in that order. The second burst may also continue for as many SSBs as the transmitting network entity is configured to transmit.

Similar to the sequences described with reference to FIGS. 5-7, SSBs may be dropped to reduce network load, while continuing to transmit a PSS and/or SSS. In the illustrated example, SSB 804*b* and SSB 807*b* are not transmitted (as shown by the dashed lines). As described with reference to FIGS. 5-7, a network entity may be configured to transmit the additional 2 symbol SSBs based on UE connectivity and/or UE request. In some aspects, the 2 symbol SSBs may be transmitted at some minimum periodicity (e.g., every 40 ms or 80 ms) and extra 2 symbol SSBs may be transmitted only when associated with a connected UE or upon UE request. If additional SSBs are transmitted for connected UEs (e.g., SSBs 804*b* and 807*b*), the PSS, SSS, and/or PBCH DMRS sequence may be different than those which are always transmitted. A UE may detect a frame boundary based on a detected sequence. In some aspects, multiple sequences may be needed for SSBs (e.g., for 60 ms or 80 ms SSBs).

Figure 9:
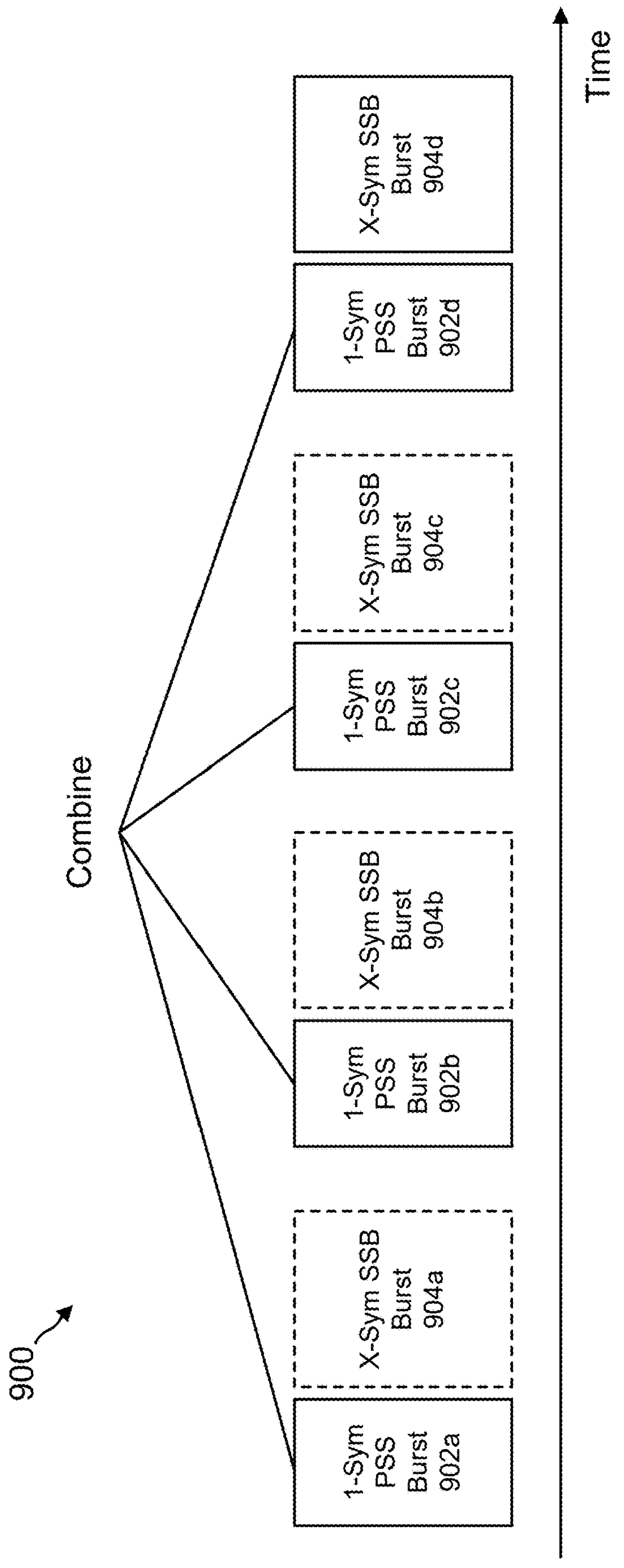
FIG. 9 illustrates an exemplary SSB sequence, according to some aspects of the present disclosure.

FIG. 9 illustrates an exemplary SSB sequence 900, according to some aspects of the present disclosure. In some UE 115 implementations, repeated signals may be received by a UE 115 by combining the repeated signal over multiple repetitions. For an SSB that is repeated at a constant known interval, a UE 115 may combine those repetitions. The introduction of variable SSB repetitions as described in FIGS. 5-9 may cause a UE to need additional information to successfully combine the signals. In some aspects, a PSS 902 may include one or more bits indicating (e.g., via one of the methods described in FIGS. 6A-6B). For example, a "0" bit may indicate that the SSB associated with the PSS is transmitted using a slower "idle" pattern (e.g., every 80 ms), and a "1" bit may indicated that the associated SSB is transmitted using an "active" pattern (e.g., every 20 ms). By using additional bits, other patterns and/or periodicities may be indicated.

A UE 115 may receive a PSS (e.g., by combining PSSs from PSS bursts 902*a*, 902*b*, 902*c*, and 902*d*). Based on the combined PSS, the UE 115 may combine SSBs at the indicated periodicity. For example, if a particular SSB is transmitted at an active pattern every 20 ms at SSB bursts 904*a*, 904*b*, 904*c*, and 904*d*, the UE 115 may combine the SSBs over each of those (or the next set of SSB bursts after the cycles in which the PSS is combined). If the indicated SSB periodicity is a slower pattern, SSBs may be combined accordingly at the times in which the SSB is actually transmitted. In some aspects, the SSB pattern may be indicated to the UE in some other method (e.g., additional signaling from the network entity transmitting the SSBs).

In some aspects, each SSB burst 904 may be a 4 symbol SSB that includes its own PSS in addition to the PSSs in PSS burst 902. The PSS in SSB burst 904 may be used to indicate the periodicity of the SSB itself. As each SSB may have its own periodicity, a UE 115 receiving an SSB in SSB burst 904 may determine the respective periodicity. Based on the indicated periodicity, a UE may combine SSBs across SSB bursts 904. The additional bits used to indicate SSB periodicity may be included with the PSS in SSB burst 904 as described in FIGS. 6A-6B.

Figure 10:
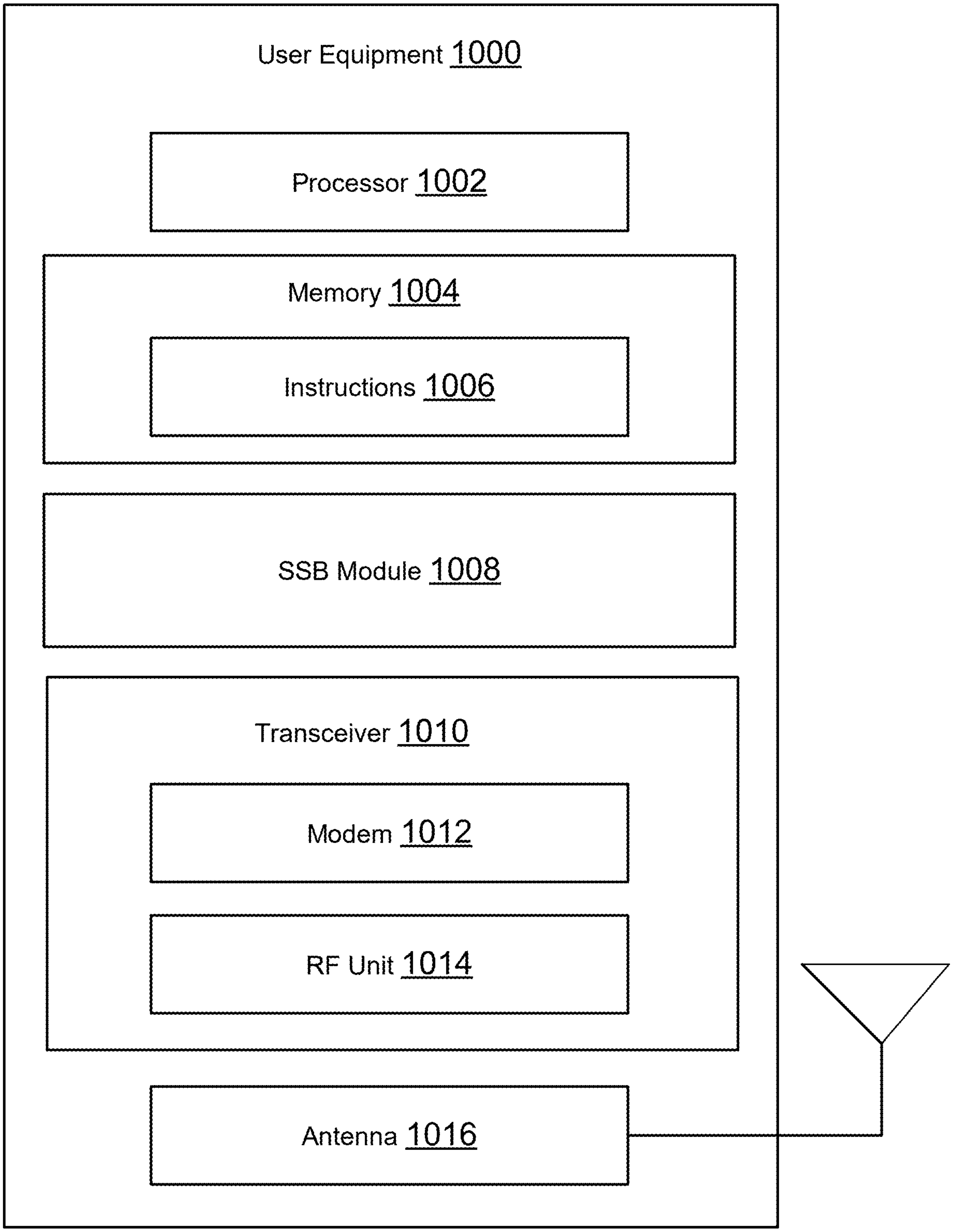
FIG. 10 is a block diagram of an exemplary user equipment (UE) according to some aspects of the present disclosure.

FIG. 10 is a block diagram of an exemplary UE 1000 according to some aspects of the present disclosure. The UE 1000 may be the UE 115 in the network 100 or 200 as discussed above. As shown, the UE 1000 may include a processor 1002, a memory 1004, a SSB module 1008, a transceiver 1010 including a modem subsystem 1012 and a radio frequency (RF) unit 1014, and one or more antennas 1016. These elements may be coupled with each other and in direct or indirect communication with each other, for example via one or more buses.

The processor 1002 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration.

The memory 1004 may include a cache memory (e.g., a cache memory of the processor 1002), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 1004 includes a non-transitory computer-readable medium. The memory 1004 may store instructions 1006. The instructions 1006 may include instructions that, when executed by the processor 1002, cause the processor 1002 to perform the operations described herein with reference to the UEs 115 in connection with aspects of the present disclosure, for example, aspects of FIGS. 4-9. Instructions 1006 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The SSB module 1008 may be implemented via hardware, software, or combinations thereof. For example, the SSB module 1008 may be implemented as a processor, circuit, and/or instructions 1006 stored in the memory 1004 and executed by the processor 1002. In some aspects, the SSB module 1008 may implement the aspects of FIGS. 4-9. For example, the SSB module 1008 of a first UE (e.g., the UE 115 or 1000) may receive, from a network unit (e.g., network unit 105 or 900), a sequence of PSSs at a first periodicity. SSB module 1008 may further receive, form the network unit, a sequence of indications at the first periodicity, each indication of the sequence of indications indicating presence of an SSB of the sequence of SSBs during a period of the first periodicity. SSB module 1008 may monitor, based on a first indication of the sequence of indications, for a first synchronization signal block (SSB) of a sequence of SSBs, wherein the sequence of SSBs is associated with a first set of frequencies and a second periodicity different from the first periodicity.

In some aspects, SSB module 1008 may be configured to receive, from a network unit, a sequence of synchronization signal blocks (SSBs) over a first set of frequencies at a first periodicity, each SSB associated with an SSB burst including a respective plurality of SSBs. SSB module 1008 may further receive, from the network unit, a sequence of PSSs at a second periodicity different from the first periodicity. SSB module 1008 may monitor for at least one additional SSB associated with additional SSB bursts over the first set of frequencies and not in the sequence of SSBs.

As shown, the transceiver 1010 may include the modem subsystem 1012 and the RF unit 1014. The transceiver 1010 can be configured to communicate bi-directionally with other devices, such as the BSs 105 and/or the UEs 115. The modem subsystem 1012 may be configured to modulate and/or encode the data from the memory 1004 and the according to a modulation and coding scheme (MCS), e.g., a low-density parity check (LDPC) coding scheme, a turbo coding scheme, a convolutional coding scheme, a digital beamforming scheme, etc. The RF unit 1014 may be configured to process (e.g., perform analog to digital conversion or digital to analog conversion, etc.) modulated/encoded data from the modem subsystem 1012 (on outbound transmissions) or of transmissions originating from another source such as a UE 115 or a BS 105. The RF unit 1014 may be further configured to perform analog beamforming in conjunction with the digital beamforming. Although shown as integrated together in transceiver 1010, the modem subsystem 1012 and the RF unit 1014 may be separate devices that are coupled together to enable the UE 1000 to communicate with other devices.

The RF unit 1014 may provide the modulated and/or processed data, e.g. data packets (or, more generally, data messages that may contain one or more data packets and other information), to the antennas 1016 for transmission to one or more other devices. The antennas 1016 may further receive data messages transmitted from other devices. The antennas 1016 may provide the received data messages for processing and/or demodulation at the transceiver 1010. The antennas 1016 may include multiple antennas of similar or different designs in order to sustain multiple transmission links. The RF unit 1014 may configure the antennas 1016.

In some instances, the UE 1000 can include multiple transceivers 1010 implementing different RATs (e.g., NR and LTE). In some instances, the UE 1000 can include a single transceiver 1010 implementing multiple RATs (e.g., NR and LTE). In some instances, the transceiver 1010 can include various components, where different combinations of components can implement RATs.

Figure 11:
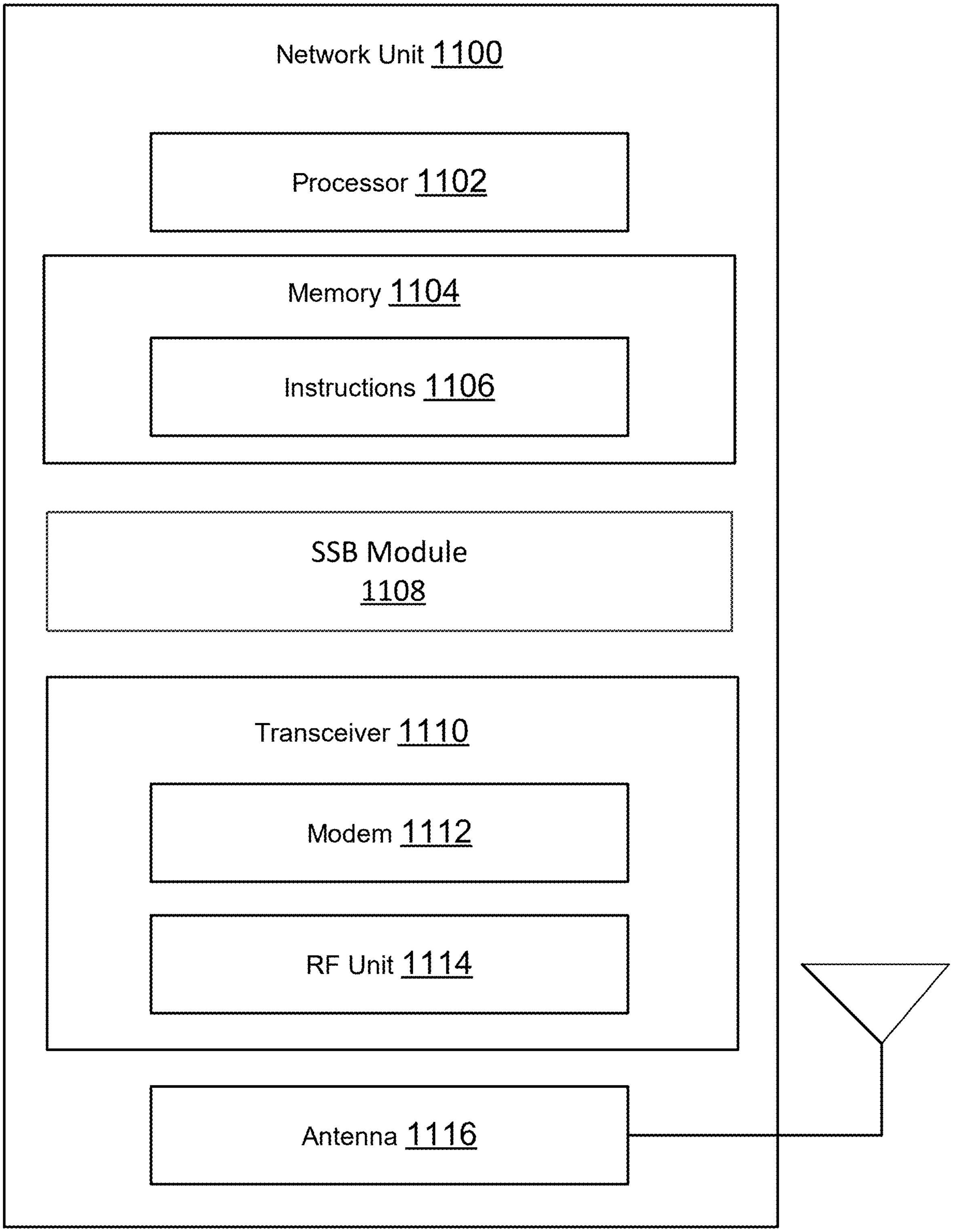
FIG. 11 is a block diagram of an exemplary network unit according to some aspects of the present disclosure.

FIG. 11 is a block diagram of an exemplary network unit 1100 according to some aspects of the present disclosure. The network unit 1100 may be the BS 105, the CU 210, the DU 230, or the RU 240, as discussed above. As shown, the network unit 1100 may include a processor 1102, a memory 1104, a SSB module 1108, a transceiver 1110 including a modem subsystem 1112 and a RF unit 1114, and one or more antennas 1116. These elements may be coupled with each other and in direct or indirect communication with each other, for example via one or more buses.

The processor 1102 may have various features as a specific-type processor. For example, these may include a CPU, a DSP, an ASIC, a controller, a FPGA device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 1104 may include a non-transitory computer-readable medium. The memory 1104 may store instructions 1106. The instructions 1106 may include instructions that, when executed by the processor 1102, cause the processor 1102 to perform operations described herein, for example, aspects of FIGS. 4-9. Instructions 1106 may also be referred to as code, which may be interpreted broadly to include any type of computer-readable statement(s).

The SSB module 1108 may be implemented via hardware, software, or combinations thereof. For example, the SSB module 1108 may be implemented as a processor, circuit, and/or instructions 1106 stored in the memory 1104 and executed by the processor 1102.

In some aspects, the SSB module 1108 may implement the aspects of FIGS. 4-9. For example, the SSB module 1108 may transmit, to a UE (e.g., the UE 115 or 800), a sequence of synchronization signal block (SSB) bursts over a first set of frequencies at a first periodicity. SSB module 1108 may further transmit, to the UE, a sequence of PSS bursts at a second periodicity different from the first periodicity. SSB module 1108 may further transmit, to the UE, a sequence of bursts of indications at the second periodicity, each indication of the sequence of bursts of indications indicating presence of an SSB of the sequence of SSB bursts during a period of the second periodicity.

In some aspects, SSB module 1108 may transmit, to a UE, a sequence of SSBs over a first set of frequencies at a first periodicity, each SSB associated with an SSB burst including a respective plurality of SSBs. SSB module 1108 may further transmit, to the UE, a sequence of PSSs at a second periodicity different from the first periodicity. SSB module 1108 may further transmit, to the UE, additional SSBs associated with additional SSB bursts over the first set of frequencies.

As shown, the transceiver 1110 may include the modem subsystem 1112 and the RF unit 1114. The transceiver 1110 can be configured to communicate bi-directionally with other devices, such as the UEs 115 and/or 600. The modem subsystem 1112 may be configured to modulate and/or encode data according to a MCS, e.g., a LDPC coding scheme, a turbo coding scheme, a convolutional coding scheme, a digital beamforming scheme, etc. The RF unit 1114 may be configured to process (e.g., perform analog to digital conversion or digital to analog conversion, etc.) modulated/encoded data from the modem subsystem 1112 (on outbound transmissions) or of transmissions originating from another source such as a UE 115 or UE 600. The RF unit 1114 may be further configured to perform analog beamforming in conjunction with the digital beamforming. Although shown as integrated together in transceiver 1110, the modem subsystem 1112 and/or the RF unit 1114 may be separate devices that are coupled together at the network unit 1100 to enable the network unit 1100 to communicate with other devices.

The RF unit 1114 may provide the modulated and/or processed data, e.g. data packets (or, more generally, data messages that may contain one or more data packets and other information), to the antennas 1116 for transmission to one or more other devices. This may include, for example, a configuration indicating a plurality of sub-slots within a slot according to aspects of the present disclosure. The antennas 1116 may further receive data messages transmitted from other devices and provide the received data messages for processing and/or demodulation at the transceiver 1110. The antennas 1116 may include multiple antennas of similar or different designs in order to sustain multiple transmission links.

In some instances, the network unit 1100 can include multiple transceivers 1110 implementing different RATs (e.g., NR and LTE). In some instances, the network unit 1100 can include a single transceiver 1110 implementing multiple RATs (e.g., NR and LTE). In some instances, the transceiver 1110 can include various components, where different combinations of components can implement RATs.

Figure 12:
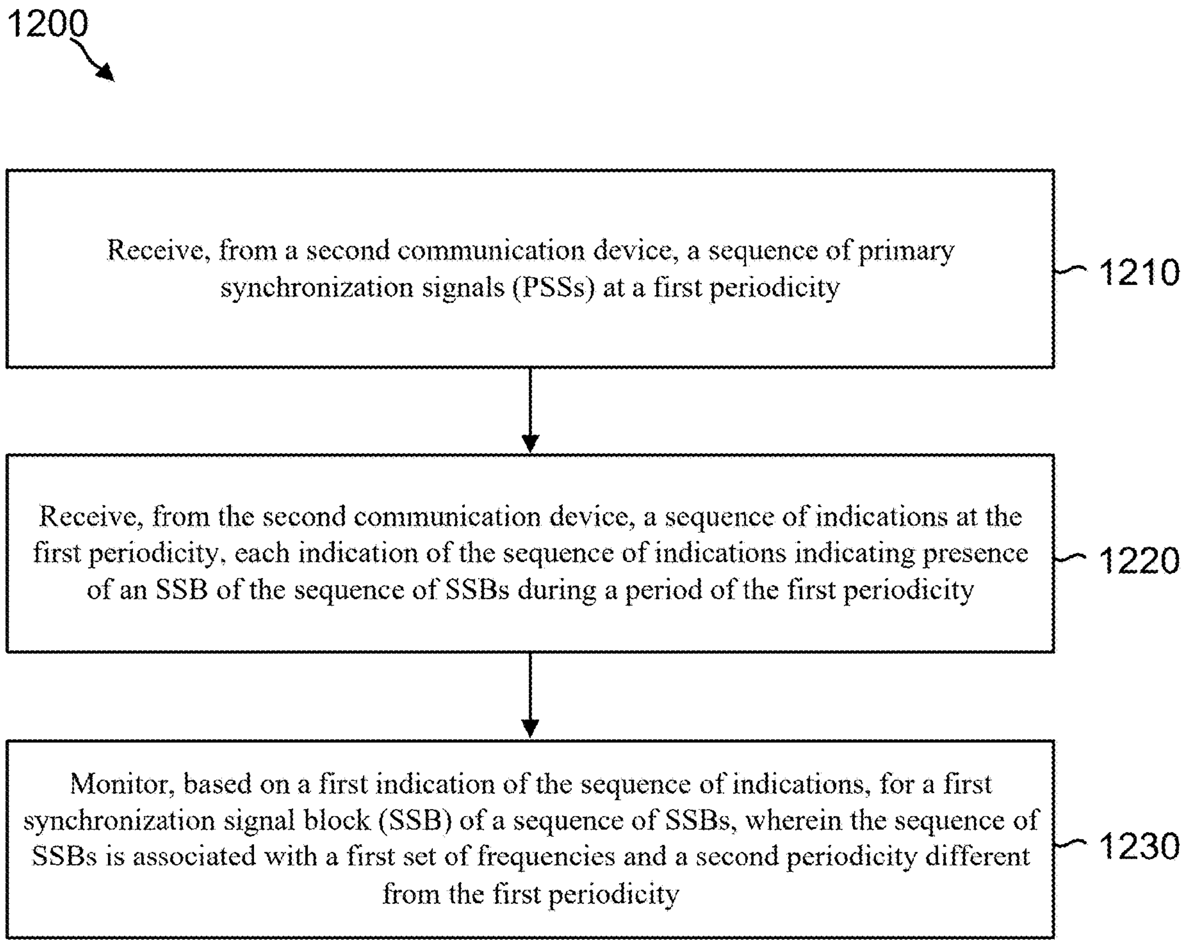
FIG. 12 is a flow diagram of a communication method according to some aspects of the present disclosure.

FIG. 12 is a flow diagram of a communication method 1200 according to some aspects of the present disclosure. Actions of the method 1200 can be executed by a computing device (e.g., a processor, processing circuit, and/or other suitable component) of an apparatus or other suitable means for performing the steps. For example, a UE, such as the UEs 115 and/or the UE 1000, may utilize one or more components, such as the processor 1002, the memory 1004, the SSB module 1008, the transceiver 1010, and the one or more antennas 1016, to execute the steps of method 1200. For instance, the method may be performed by an application processor, a modem chipset, and SOC hosting an application processor and modem chipset, or the like.

As illustrated, the method 1200 includes a number of enumerated actions, but aspects of the method 1200 may include additional steps before, after, and in between the enumerated actions. In some aspects, one or more of the enumerated actions may be omitted or performed in a different order.

At block 1210, a first communication device receives, from a second communication device (e.g., a BS 105, CU 210, DU 230, and/or network unit 1100), a sequence of primary synchronization signals (PSSs) at a first periodicity (e.g. PSS bursts 502, 702, or 902).

At block 1220, the first communication device receives, from the second communication device, a sequence of indications at the first periodicity, each indication of the sequence of indications indicating presence of an SSB of the sequence of SSBs during a period of the first periodicity.

At block 1230, the first communication device monitors, based on a first indication of the sequence of indications, for a first synchronization signal block (SSB) of a sequence of SSBs, wherein the sequence of SSBs is associated with a first set of frequencies and a second periodicity different from the first periodicity. In some aspects, receiving the sequence of PSSs is over a subset of the first set of frequencies (e.g., as illustrated in FIG. 6A). In some aspects, the first communication device may receive the sequence of indications by frequency division multiplexing with the sequence of PSSs over one or more frequencies of the first set of frequencies not in the subset (e.g., as illustrated in FIG. 6A). In some aspects, receiving the sequence of PSSs is over the entire first set of frequencies, and the sequence of PSSs contains the sequence of indications (e.g., as illustrated in FIG. 6B). In some aspects, each indication of the sequence of indications includes a single bit that indicates presence of an SSB of the sequence of SSBs during a period of the first periodicity containing the indication. In some aspects, each indication of the sequence of indications includes a multi-bit value indicating presence of an SSB of the sequence of SSBs during a period of the first periodicity containing the indication or a subsequent period. For example, the multi-bit value may be a value indicating the number of periods before a period including an SSB. In some aspects, each SSB of the sequence of SSBs includes at least one of a PBCH message, a PSS, or a SSS.

Figure 13:
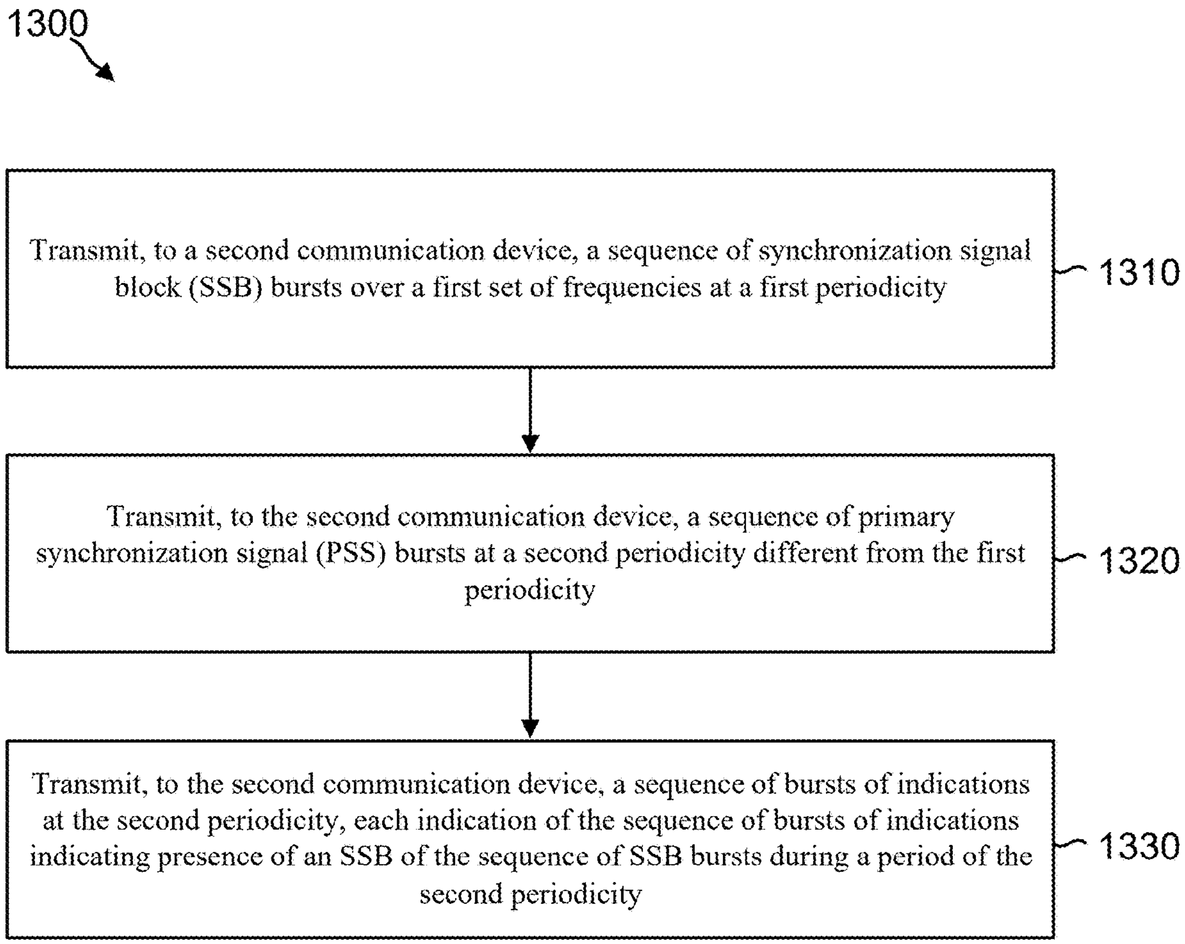
FIG. 13 is a flow diagram of a communication method according to some aspects of the present disclosure.

FIG. 13 is a flow diagram of a communication method 1300 according to some aspects of the present disclosure. Actions of the method 300 can be executed by a computing device (e.g., a processor, processing circuit, and/or other suitable component) of an apparatus or other suitable means for performing the steps. For example, a network unit, such as the BSs 105, CU 210, DU 230, and/or the network unit 1100, may utilize one or more components, such as the processor 1102, the memory 1104, the SSB module 1108, the transceiver 1110, and the one or more antennas 1116, to execute the steps of method 1300. For instance, the method may be performed by an application processor, a modem chipset, and SOC hosting an application processor and modem chipset, or the like.

As illustrated, the method 1300 includes a number of enumerated actions, but aspects of the method 1300 may include additional steps before, after, and in between the enumerated actions. In some aspects, one or more of the enumerated actions may be omitted or performed in a different order.

At block 1310, a first communication device transmits, to a second communication device (e.g., a UE 115 or UE 1000), a sequence of synchronization signal block (SSB) bursts over a first set of frequencies at a first periodicity. In some aspects, each SSB of the sequence of SSB bursts includes at least one of a PBCH message, a PSS, or a SSS.

At block 1320, the first communication device transmits, to the second communication device, a sequence of primary synchronization signal (PSS) bursts at a second periodicity different from the first periodicity. In some aspects, the first communication device transmits the sequence of PSS bursts over a subset of the first set of frequencies (e.g., as illustrated in FIG. 6A). In some aspects, the first communication device transmits the sequence of PSS bursts over the entire first set of frequencies, and the sequence of PSS bursts contains the sequence of bursts of indications (e.g., as illustrated in FIG. 6B).

At block 1330, the first communication device transmits, to the second communication device, a sequence of bursts of indications at the second periodicity, each indication of the sequence of bursts of indications indicating presence of an SSB of the sequence of SSB bursts during a period of the second periodicity. In some aspects, the first communication device transmits the sequence of bursts of indications by frequency division multiplexing the sequence of PSS bursts over one or more frequencies of the first set of frequencies not in the subset (e.g., as illustrated in FIG. 6A). In some aspects, each indication of the sequence of bursts of indications includes a single bit that indicates presence of an SSB of the sequence of SSB bursts during a period of the second periodicity containing the indication. In some aspects, each indication of the sequence of bursts of indications includes a multi-bit value indicating presence of an SSB of the sequence of SSB bursts during a period of the second periodicity containing the indication or a subsequent period.

Figure 14:
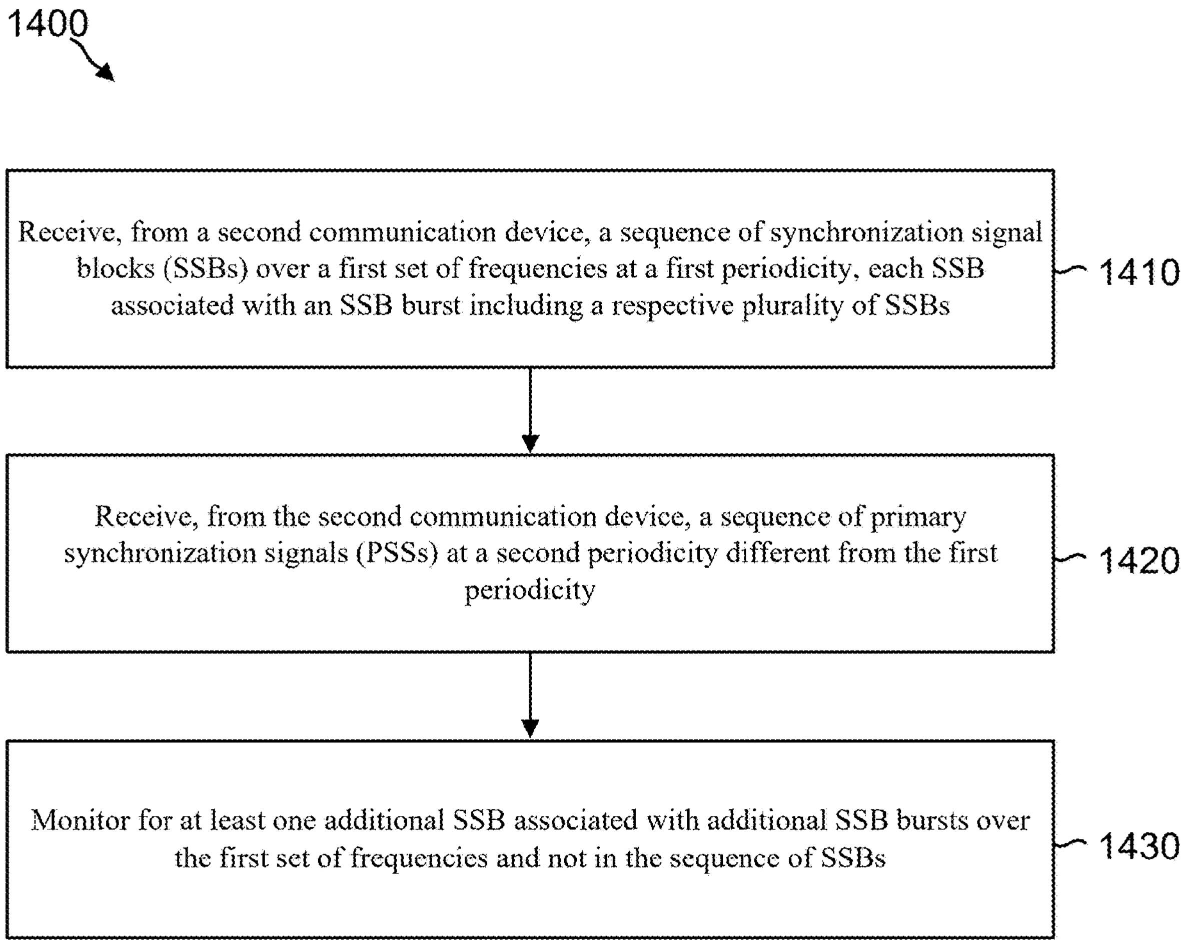
FIG. 14 is a flow diagram of a communication method according to some aspects of the present disclosure.

FIG. 14 is a flow diagram of a communication method 1400 according to some aspects of the present disclosure. Actions of the method 1400 can be executed by a computing device (e.g., a processor, processing circuit, and/or other suitable component) of an apparatus or other suitable means for performing the steps. For example, a UE, such as the UEs 115 and/or the UE 1000, may utilize one or more components, such as the processor 1002, the memory 1004, the SSB module 1008, the transceiver 1010, and the one or more antennas 1016, to execute the steps of method 1400. For instance, the method may be performed by an application processor, a modem chipset, and SOC hosting an application processor and modem chipset, or the like.

As illustrated, the method 1400 includes a number of enumerated actions, but aspects of the method 1400 may include additional steps before, after, and in between the enumerated actions. In some aspects, one or more of the enumerated actions may be omitted or performed in a different order.

At block 1410, a first communication device receives, from a second communication device (e.g., a BS 105, CU 210, DU 230, and/or network unit 1100), a sequence of synchronization signal blocks (SSBs) over a first set of frequencies at a first periodicity, each SSB associated with an SSB burst including a respective plurality of SSBs.

At block 1420, the first communication device receives, from the second communication device, a sequence of primary synchronization signals (PSSs) at a second periodicity different from the first periodicity.

At block 1430, the first communication device monitors for at least one additional SSB associated with additional SSB bursts over the first set of frequencies and not in the sequence of SSBs. In some aspects, the first communication device transmits, to the second communication device, a request for the at least one additional SSB. In some aspects, the first communication device monitors for the at least one additional SSB in response to the request. In some aspects, the first communication device monitors for the at least one additional SSB in response to the first communication device establishing a connection with the second communication device. In some aspects, the content of the at least one additional SSB is different from a content of SSBs of the sequence of SSBs. For example, the SSBs of the sequence of SSBs may be two-symbol SSBs including only PBCH, and the at least one additional SSB may include PBCH in addition to a PSS and/or an SSS. In some aspects, the at least one additional SSB may be associated with a subset of the SSBs of the sequence of SSBs. For example, the second communication device may be transmitting a first number of SSBs at the first periodicity (e.g., every 80 ms), but the subset of those SSBs associated with connected devices may be transmitted (and potentially received) at a higher periodicity (e.g., every 20 ms or 40 ms). Each SSB ID may have its own periodicity, which may or may not be the same as the second periodicity. For example, as the SSB subset bursts described with respect to FIG. 7.

In some aspects, the first communication device receives, from the second communication device, a sequence of SSSs at the second periodicity, wherein each SSB of the sequence of SSBs includes one or more PBCH messages an no PSS and no SSS. In some aspects, the first communication device receives a plurality of indications, wherein each indication of the plurality of indications is associated with a respective SSB of the sequence of SSBs or the at least one additional SSB. Each indication may indicate a periodicity of the associated respective SSB. In some aspects, the first communication device may combine a plurality of PSSs of the sequence of PSSs at the second periodicity. For example, combining may include receiving a PSS by combining multiple repetitions of the PSS. In some aspects, the first communication device may combine a plurality of SSBs of the sequence of SSBs based on the combined PSS. For example, the combined PSS may include an indication of what period(s) include SSBs and/or the periodicity of SSBs, and based on this information the first communication device may combine SSBs at the correct periodicity. In some aspects, the first communication device combines the plurality of SSBs at the first periodicity or the second periodicity based on an indication of the plurality of indications. In some aspects, the indication of the plurality of indications may be in a PSS of the sequence of PSSs (e.g., as a one bit or multi-bit indication). In some aspects, the PSS may include an indication which is used for combining an SSS and/or a PBCH based on the period indication in the PSS. In some aspects, the combining of the PSS is based on a 20 ms periodicity which may be guaranteed for the sequence of PSSs.

In some aspects, each indication of the plurality of indications includes a single bit indicating the first periodicity or the second periodicity. In some aspects, each indication of the plurality of indications includes a plurality of bits indicating a third periodicity different from the first periodicity and the second periodicity. For example, the first periodicity may be 80 ms, the second periodicity may be 20 ms, and the third periodicity may be 40 ms.

Figure 15:
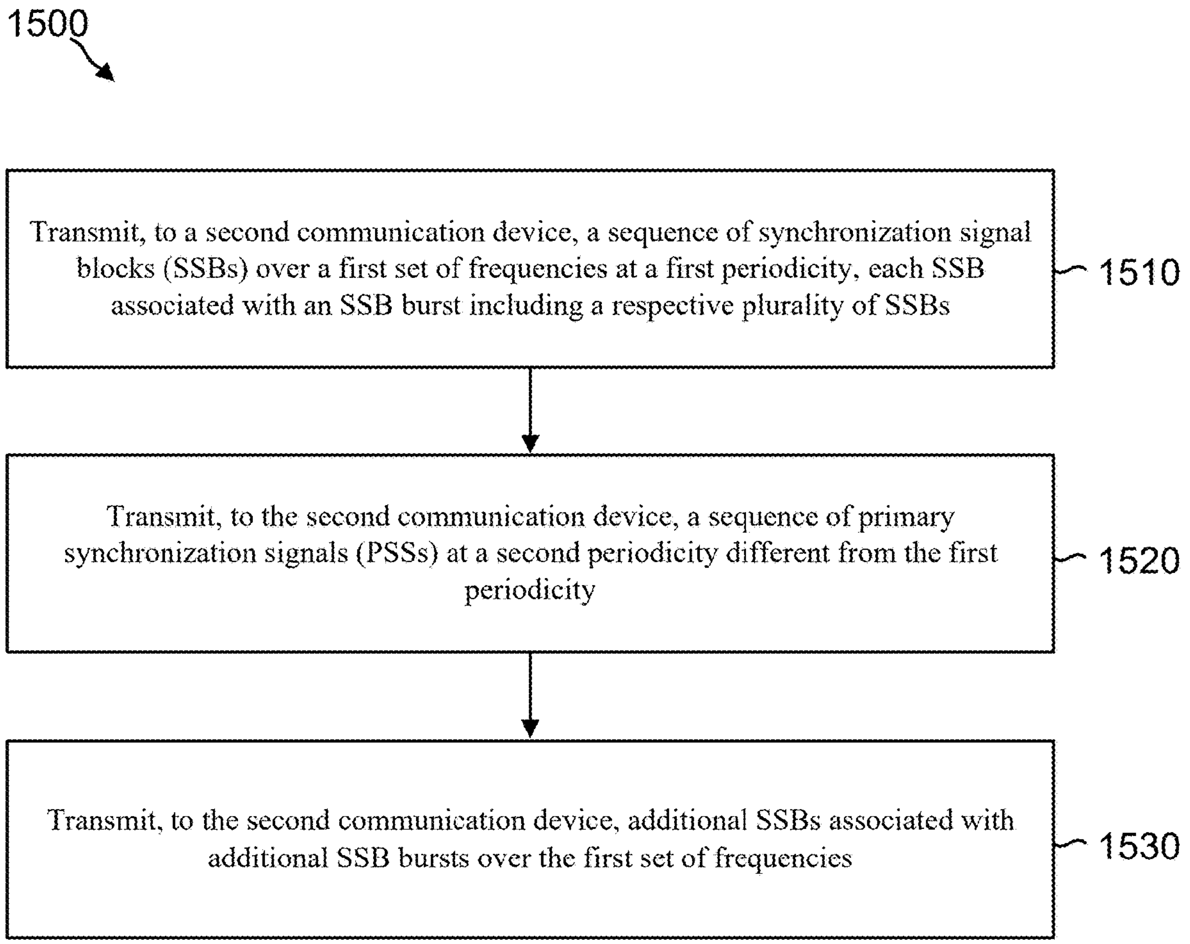
FIG. 15 is a flow diagram of a communication method according to some aspects of the present disclosure.

FIG. 15 is a flow diagram of a communication method 1500 according to some aspects of the present disclosure. Actions of the method 300 can be executed by a computing device (e.g., a processor, processing circuit, and/or other suitable component) of an apparatus or other suitable means for performing the steps. For example, a network unit, such as the BSs 105, CU 210, DU 230, and/or the network unit 1100, may utilize one or more components, such as the processor 1102, the memory 1104, the SSB module 1108, the transceiver 1110, and the one or more antennas 1116, to execute the steps of method 1500. For instance, the method may be performed by an application processor, a modem chipset, and SOC hosting an application processor and modem chipset, or the like.

As illustrated, the method 1500 includes a number of enumerated actions, but aspects of the method 1500 may include additional steps before, after, and in between the enumerated actions. In some aspects, one or more of the enumerated actions may be omitted or performed in a different order.

At block 1510, a first communication device transmits, to a second communication device (e.g., a UE 115 or UE 1000), a sequence of synchronization signal blocks (SSBs) over a first set of frequencies at a first periodicity, each SSB associated with an SSB burst including a respective plurality of SSBs.

At block 1520, the first communication device transmits, to the second communication device, a sequence of primary synchronization signals (PSSs) at a second periodicity different from the first periodicity. In some aspects, the first communication device transmits, to the second communication device, a sequence of SSSs at the second periodicity, wherein each SSB of the sequence of SSBs includes one or more PBCH messages and no PSS and no SSS, for example as illustrated in FIG. 8.

At block 1530, the first communication device transmits, to the second communication device, additional SSBs associated with additional SSB bursts over the first set of frequencies. In some aspects, the additional SSB bursts are associated with a subset of SSBs of the SSB bursts. In some aspects, the first communication device receives, from the second communication device, a request for the additional SSBs, and transmits the additional SSBs in response to the request. In some aspects, the first communication device transmits the additional SSBs in response to the first communication device establishing a connection with the second communication device. In some aspects, the content of the additional SSBs is different from the content of SSBs of the sequence of SSBs. For example, the SSBs of the sequence of SSBs may be two-symbol SSBs including only PBCH, and the at additional SSBs may include PBCH in addition to a PSS and/or an SSS.

In some aspects, the first communication device transmits a plurality of indications. Each indication of the plurality of indications may be associated with a respective SSB of the sequence of SSBs or the additional SSBs (e.g., via an SSB ID). Each indication may indicate a periodicity of the associated respective SSB. In some aspects, each indication of the plurality of indications is transmitted by frequency division multiplexing with PSSs included in each SSB of the sequence of SSBs and the additional SSBs over one o more frequencies of the first set of frequencies.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular implementations illustrated and described herein, as they are merely by way of some examples thereof, but rather, should be fully commensurate with that of the claims appended hereafter and their functional equivalents.

Various embodiments are further described with respect to the enumerated aspects below:

Aspect 1. A first communication device, comprising:
- one or more memories; and
- one or more processors coupled to the one or more memories, the one or more memories storing instructions that are executable by the one or more processors, configured individually or in any combination, to cause the first communication device to:
- receive, from a second communication device, a sequence of primary synchronization signals (PSSs) at a first periodicity;

receive, from the second communication device, a sequence of indications at the first periodicity, each indication of the sequence of indications indicating presence of an SSB of the sequence of SSBs during a period of the first periodicity; and monitor, based on a first indication of the sequence of indications, for a first synchronization signal block (SSB) of a sequence of SSBs, wherein the sequence of SSBs is associated with a first set of frequencies and a second periodicity different from the first periodicity.

Aspect 2. The first communication device of aspect 1 wherein the receiving the sequence of PSSs is over a subset of the first set of frequencies, the one or more processors further configured to cause the first communication device to:
- receive the sequence of indications by frequency division multiplexing with the sequence of PSSs over one or more frequencies of the first set of frequencies not in the subset.

Aspect 3. The first communication device of aspect 1, wherein the receiving the sequence of PSSs is over the entire first set of frequencies, and the sequence of PSSs contains the sequence of indications.

Aspect 4. The first communication device of any of aspects 1-3, wherein each indication of the sequence of indications includes a single bit that indicates presence of an SSB of the sequence of SSBs during a period of the first periodicity containing the indication.

Aspect 5. The first communication device of any of aspects 1-3, wherein each indication of the sequence of indications includes a multi-bit value indicating presence of an SSB of the sequence of SSBs during a period of the first periodicity containing the indication or a subsequent period.

Aspect 6. The first communication device of any of aspects 1-5, wherein each SSB of the sequence of SSBs includes at least one of:
- a physical broadcast channel (PBCH) message,
- a PSS, or
- a secondary synchronization signal (SSS).

Aspect 7. A first communication device, comprising:

one or more memories; and one or more processors coupled to the one or more memories, the one or more memories storing instructions that are executable by the one or more processors, configured individually or in any combination, to cause the first communication device to: transmit, to a second communication device, a sequence of synchronization signal block (SSB) bursts over a first set of frequencies at a first periodicity;

transmit, to the second communication device, a sequence of primary synchronization signal (PSS) bursts at a second periodicity different from the first periodicity; and transmit, to the second communication device, a sequence of bursts of indications at the second periodicity, each indication of the sequence of bursts of indications indicating presence of an SSB of the sequence of SSB bursts during a period of the second periodicity.

Aspect 8. The first communication device of aspect 7 wherein the one or more processors are further configured to cause the first communication device to: transmit the sequence of PSS bursts over a subset of the first set of frequencies; and transmit the sequence of bursts of indications by frequency division multiplexing the sequence of PSS bursts over one or more frequencies of the first set of frequencies not in the subset.

Aspect 9. The first communication device of aspect 7, wherein the one or more processors are further configured to cause the first communication device to transmit the sequence of PSS bursts over the entire first set of frequencies, and the sequence of PSS bursts contains the sequence of bursts of indications.

Aspect 10. The first communication device of any of aspects 7-9, wherein each indication of the sequence of bursts of indications includes a single bit that indicates presence of an SSB of the sequence of SSB bursts during a period of the second periodicity containing the indication.

Aspect 11. The first communication device of any of aspects 7-9, wherein each indication of the sequence of bursts of indications includes a multi-bit value indicating presence of an SSB of the sequence of SSB bursts during a period of the second periodicity containing the indication or a subsequent period.

Aspect 12. The first communication device of any of aspects 7-11, wherein each SSB of the sequence of SSB bursts includes at least one of:

a physical broadcast channel (PBCH) message, a PSS, or a secondary synchronization signal (SSS).

Aspect 13. A first communication device, comprising:

one or more memories; and one or more processors coupled to the one or more memories, the one or more memories storing instructions that are executable by the one or more processors, configured individually or in any combination, to cause the first communication device to:

receive, from a second communication device, a sequence of synchronization signal blocks (SSBs) over a first set of frequencies at a first periodicity, each SSB associated with an SSB burst including a respective plurality of SSBs;

receive, from the second communication device, a sequence of primary synchronization signals (PSSs) at a second periodicity different from the first periodicity; and monitor for at least one additional SSB associated with additional SSB bursts over the first set of frequencies and not in the sequence of SSBs.

Aspect 14. The first communication device of aspect 13, wherein the one or more processors are further configured to cause the first communication device to:

transmit, to the second communication device, a request for the at least one additional SSB; and monitor for the at least one additional SSB in response to the request.

Aspect 15. The first communication device of aspect 13, wherein the one or more processors are further configured to cause the first communication device to monitor for the at least one additional SSB in response to the first communication device establishing a connection with the second communication device.

Aspect 16. The first communication device of any of aspects 13-15, wherein a content of the at least one additional SSB is different from a content of SSBs of the sequence of SSBs.

Aspect 17. The first communication device of any of aspects 13-16, wherein the one or more processors are further configured to cause the first communication device to:

receive, from the second communication device, a sequence of secondary synchronization signals (SSSs) at the second periodicity, wherein each SSB of the sequence of SSBs includes one or more physical broadcast channel (PBCH) messages and no PSS and no SSS.

Aspect 18. The first communication device of any of aspects 13-17, wherein the one or more processors are further configured to cause the first communication device to:

receive a plurality of indications, wherein each indication of the plurality of indications is associated with a respective SSB of the sequence of SSBs or the at least one additional SSB, and wherein each indication indicates a periodicity of the associated respective SSB.

Aspect 19. The first communication device of aspect 18, wherein the one or more processors are further configured to cause the first communication device to:

combine a plurality of PSSs of the sequence of PSSs at the second periodicity; and combine a plurality of SSBs of the sequence of SSBs based on the combined PSS.

Aspect 20. The first communication device of aspect 18, wherein the one or more processors are further configured to cause the first communication device to combine the plurality of SSBs at the first periodicity or the second periodicity based on an indication of the plurality of indications.

Aspect 21. The first communication device of any of aspects 18-20, wherein each indication of the plurality of indications includes a single bit indicating the first periodicity or the second periodicity.

Aspect 22. The first communication device of any of aspects 18-20, wherein each indication of the plurality of indications includes a plurality of bits indicating a third periodicity different from the first periodicity and the second periodicity.

Aspect 23. A first communication device, comprising:

one or more memories; and one or more processors coupled to the one or more memories, the one or more memories storing instructions that are executable by the one or more processors, configured individually or in any combination, to cause the first communication device to:

transmit, to a second communication device, a sequence of synchronization signal blocks (SSBs) over a first set of frequencies at a first periodicity, each SSB associated with an SSB burst including a respective plurality of SSBs;

transmit, to the second communication device, a sequence of primary synchronization signals (PSSs) at a second periodicity different from the first periodicity; and transmit, to the second communication device, additional SSBs associated with additional SSB bursts over the first set of frequencies.

Aspect 24. The first communication device of aspect 23, wherein the additional SSB bursts are associated with a subset of SSBs of the SSB bursts.

Aspect 25. The first communication device of any of aspects 23-24, wherein the one or more processors are further configured to cause the first communication device to:

receive, from the second communication device, a request for the additional SSBs; and transmit the additional SSBs in response to the request.

Aspect 26. The first communication device of any of aspects 23-24, wherein the one or more processors are further configured to cause the first communication device to:

transmit the additional SSBs in response to the first communication device establishing a connection with the second communication device.

Aspect 27. The first communication device of any of aspects 23-26, wherein a content of the additional SSBs is different from a content of SSBs of the sequence of SSBs.

Aspect 28. The first communication device of any of aspects 23-27, wherein the one or more processors are further configured to cause the first communication device to:

transmit, to the second communication device, a sequence of secondary synchronization signals (SSSs) at the second periodicity, wherein each SSB of the sequence of SSBs includes one or more physical broadcast channel (PBCH) messages and no PSS and no SSS.

Aspect 29. The first communication device of any of aspects 23-28, wherein the one or more processors are further configured to cause the first communication device to:

transmit a plurality of indications, wherein each indication of the plurality of indications is associated with a respective SSB of the sequence of SSBs or the additional SSBs, and wherein each indication indicates a periodicity of the associated respective SSB.

Aspect 30. The first communication device of aspect 29, wherein each indication of the plurality of indications is transmitted by frequency division multiplexing with PSSs included in each SSB of the sequence of SSBs and the additional SSBs over one or more frequencies of the first set of frequencies.

Aspect 31. A method of wireless communication performed by a first communication device, comprising:

receiving, from a second communication device, a sequence of primary synchronization signals (PSSs) at a first periodicity;

receiving, from the second communication device, a sequence of indications at the first periodicity, each indication of the sequence of indications indicating presence of an SSB of the sequence of SSBs during a period of the first periodicity; and monitoring, based on a first indication of the sequence of indications, for a first synchronization signal block (SSB) of a sequence of SSBs, wherein the sequence of SSBs is associated with a first set of frequencies and a second periodicity different from the first periodicity.

Aspect 32. A method of wireless communication performed by a first communication device, comprising:

transmitting, to a second communication device, a sequence of synchronization signal block (SSB) bursts over a first set of frequencies at a first periodicity;

transmitting, to the second communication device, a sequence of primary synchronization signal (PSS) bursts at a second periodicity different from the first periodicity; and transmitting, to the second communication device, a sequence of bursts of indications at the second periodicity, each indication of the sequence of bursts of indications indicating presence of an SSB of the sequence of SSB bursts during a period of the second periodicity.

Aspect 33. A method of wireless communication performed by a first communication device, comprising:

receiving, from a second communication device, a sequence of synchronization signal blocks (SSBs) over a first set of frequencies at a first periodicity, each SSB associated with an SSB burst including a respective plurality of SSBs;

receiving, from the second communication device, a sequence of primary synchronization signals (PSSs) at a second periodicity different from the first periodicity; and monitoring for at least one additional SSB associated with additional SSB bursts over the first set of frequencies and not in the sequence of SSBs.

Aspect 34. A method of wireless communication performed by a first communication device, comprising:

transmitting, to a second communication device, a sequence of synchronization signal blocks (SSBs) over a first set of frequencies at a first periodicity, each SSB associated with an SSB burst including a respective plurality of SSBs;

transmitting, to the second communication device, a sequence of primary synchronization signals (PSSs) at a second periodicity different from the first periodicity; and transmitting, to the second communication device, additional SSBs associated with additional SSB bursts over the first set of frequencies.

What is claimed is:

1. A first communication device, comprising:

one or more memories; and one or more processors coupled to the one or more memories, the one or more memories storing instructions that are executable by the one or more processors, configured individually or collectively, to cause the first communication device to:

receive, from a second communication device, a sequence of synchronization signal blocks (SSBs) over a first set of frequencies at a first periodicity, each SSB associated with an SSB burst including a respective plurality of SSBs;

receive, from the second communication device, a sequence of primary synchronization signals (PSSs) at a second periodicity different from the first periodicity; and monitor for at least one additional SSB associated with additional SSB bursts over the first set of frequencies and not in the sequence of SSBs.

2. The first communication device of claim 1, wherein the one or more processors are further configured to cause the first communication device to:

transmit, to the second communication device, a request for the at least one additional SSB; and monitor for the at least one additional SSB in response to the request.

3. The first communication device of claim 1, wherein the one or more processors are further configured to cause the first communication device to monitor for the at least one additional SSB in response to the first communication device establishing a connection with the second communication device.

4. The first communication device of claim 1, wherein a content of the at least one additional SSB is different from a content of SSBs of the sequence of SSBs.

5. The first communication device of claim 1, wherein the one or more processors are further configured to cause the first communication device to:

receive, from the second communication device, a sequence of secondary synchronization signals (SSSs) at the second periodicity, wherein each SSB of the sequence of SSBs includes one or more physical broadcast channel (PBCH) messages and no PSS and no SSS.

6. The first communication device of claim 1, wherein the one or more processors are further configured to cause the first communication device to:

receive a plurality of indications, wherein each indication of the plurality of indications is associated with a respective SSB of the sequence of SSBs or the at least one additional SSB, and wherein each indication indicates a periodicity of the associated respective SSB.

7. The first communication device of claim 6, wherein the one or more processors are further configured to cause the first communication device to:

combine a plurality of PSSs of the sequence of PSSs at the second periodicity; and combine a plurality of SSBs of the sequence of SSBs based on the combined PSSs.

8. The first communication device of claim 6, wherein the one or more processors are further configured to cause the first communication device to combine the plurality of SSBs at the first periodicity or the second periodicity based on an indication of the plurality of indications.

9. The first communication device of claim 6, wherein each indication of the plurality of indications includes a single bit indicating the first periodicity or the second periodicity.

10. The first communication device of claim 6, wherein each indication of the plurality of indications includes a plurality of bits indicating a third periodicity different from the first periodicity and the second periodicity.

11. A method performed by a first communication device, the method comprising:

receiving, from a second communication device, a sequence of synchronization signal blocks (SSBs) over a first set of frequencies at a first periodicity, each SSB associated with an SSB burst including a respective plurality of SSBs;

receiving, from the second communication device, a sequence of primary synchronization signals (PSSs) at a second periodicity different from the first periodicity; and monitoring for at least one additional SSB associated with additional SSB bursts over the first set of frequencies and not in the sequence of SSBs.

12. The method of claim 11, further comprising:

transmitting, to the second communication device, a request for the at least one additional SSB; and monitoring for the at least one additional SSB in response to the request.

13. The method of claim 11, further comprising:

monitoring for the at least one additional SSB in response to the first communication device establishing a connection with the second communication device.

14. The method of claim 11, wherein a content of the at least one additional SSB is different from a content of SSBs of the sequence of SSBs.

15. The method of claim 11, further comprising:

receiving, from the second communication device, a sequence of secondary synchronization signals (SSSs) at the second periodicity, wherein each SSB of the sequence of SSBs includes one or more physical broadcast channel (PBCH) messages and no PSS and no SSS.

16. The method of claim 11, further comprising:

receiving a plurality of indications, wherein each indication of the plurality of indications is associated with a respective SSB of the sequence of SSBs or the at least one additional SSB, and wherein each indication indicates a periodicity of the associated respective SSB.

17. The method of claim 16, further comprising:

combining a plurality of PSSs of the sequence of PSSs at the second periodicity; and combining a plurality of SSBs of the sequence of SSBs based on the combined PSSs.

18. The method of claim 16, further comprising:

combining the plurality of SSBs at the first periodicity or the second periodicity based on an indication of the plurality of indications.

19. The method of claim 16, wherein each indication of the plurality of indications includes a single bit indicating the first periodicity or the second periodicity.

20. The method of claim 16, wherein each indication of the plurality of indications includes a plurality of bits indicating a third periodicity different from the first periodicity and the second periodicity.

* * * * *